(12) United States Patent
Skradski et al.

(10) Patent No.: US 7,901,164 B2
(45) Date of Patent: Mar. 8, 2011

(54) DEBRIS SHIELD FOR A ROTARY TOOL OR MACHINE

(76) Inventors: Thomas J. Skradski, Oakland, CA (US); Gary L. Cross, San Francisco, CA (US)

( * ) Notice: Subject to any disclaimer, the term of this patent is extended or adjusted under 35 U.S.C. 154(b) by 746 days.

(21) Appl. No.: 11/510,260

(22) Filed: Aug. 25, 2006

(65) Prior Publication Data

US 2007/0065242 A1 Mar. 22, 2007

Related U.S. Application Data

(63) Continuation-in-part of application No. 11/123,836, filed on May 6, 2005, now abandoned.

(60) Provisional application No. 60/569,171, filed on May 7, 2004.

(51) Int. Cl.
*B23B 47/34* (2006.01)

(52) U.S. Cl. ............... 408/67; 408/112; 175/209

(58) Field of Classification Search .......... 455/522, 455/69; 408/67, 110–112; 175/209–211
See application file for complete search history.

(56) References Cited

U.S. PATENT DOCUMENTS

| | | | | |
|---|---|---|---|---|
| 994,430 | A * | 6/1911 | Tunks ............... | 408/56 |
| 2,792,199 | A | 5/1957 | Becker et al. | |
| 2,828,108 | A * | 3/1958 | Hood et al. ........ | 175/211 |
| 3,351,143 | A | 11/1967 | Seibold et al. | |
| 3,536,149 | A * | 10/1970 | Laird ............... | 175/209 |
| 3,583,821 | A | 6/1971 | Shaub et al. | |
| 3,936,213 | A | 2/1976 | Kappel | |
| 4,214,317 | A | 7/1980 | Kelly, Sr. | |
| 4,251,171 | A | 2/1981 | Brett | |
| 4,317,282 | A | 3/1982 | Pace | |
| 4,372,401 | A * | 2/1983 | Fischer ............ | 175/209 |
| 4,688,651 | A | 8/1987 | Dysart | |
| 4,762,189 | A | 8/1988 | Tatum | |
| 4,921,375 | A | 5/1990 | Famulari | |
| 5,653,561 | A | 8/1997 | May | |
| 5,933,763 | A * | 8/1999 | Wang et al. ........ | 340/7.22 |
| 6,035,209 | A * | 3/2000 | Tiedemann et al. ... | 455/522 |
| 6,120,220 | A | 9/2000 | Speare | |
| 6,457,915 | B1 * | 10/2002 | Kao ................ | 408/67 |
| 6,565,294 | B1 | 5/2003 | Young | |
| 6,814,527 | B1 * | 11/2004 | Fleming ........... | 408/67 |
| 7,185,256 | B2 * | 2/2007 | Miki et al. ........ | 714/751 |
| 7,203,182 | B2 * | 4/2007 | Hwang ............ | 370/338 |
| 7,322,429 | B2 * | 1/2008 | Kim ............... | 173/198 |
| 2002/0101835 | A1 * | 8/2002 | Gerakoulis ......... | 370/329 |

(Continued)

FOREIGN PATENT DOCUMENTS

DE 29703689 U1 * 5/1997

(Continued)

*Primary Examiner* — Daniel W Howell
(74) *Attorney, Agent, or Firm* — Beeson Skinner Beverly, LLP

(57) ABSTRACT

A debris shield for a rotary tool or machine for collecting debris generated while cutting or drilling holes in a work surface has a debris collection housing having a top structure, side walls depending from said top cover structure to form a debris collection chamber, an open bottom with a surface contact rim, and a compression axis extending through the housing's top structure and bottom opening. In one aspect of the invention, the debris collection housing is a bellows housing with a vacuum port, and has a shank-holding and vent assembly in top structure of the bellows housing for receiving and rotatably holding the shank of a rotary surface working implement such as a drill bit, spade bit or hole saw.

47 Claims, 34 Drawing Sheets

U.S. PATENT DOCUMENTS

2003/0157953 A1 * 8/2003 Das et al. ................. 455/522
2007/0264092 A1 * 11/2007 Kesten ..................... 408/67

FOREIGN PATENT DOCUMENTS

| | | | | |
|---|---|---|---|---|
| DE | 29804328 | U1 | * | 7/1998 |
| EP | 1593447 | A1 | * | 11/2005 |
| GB | 2159619 | A | * | 12/1985 |
| JP | 11058111 | A | * | 3/1999 |
| JP | 2000317709 | A | * | 11/2000 |
| JP | 2000334636 | A | * | 12/2000 |
| JP | 2001259960 | A | * | 9/2001 |
| WO | WO 98/26619 | | * | 6/1998 |

* cited by examiner

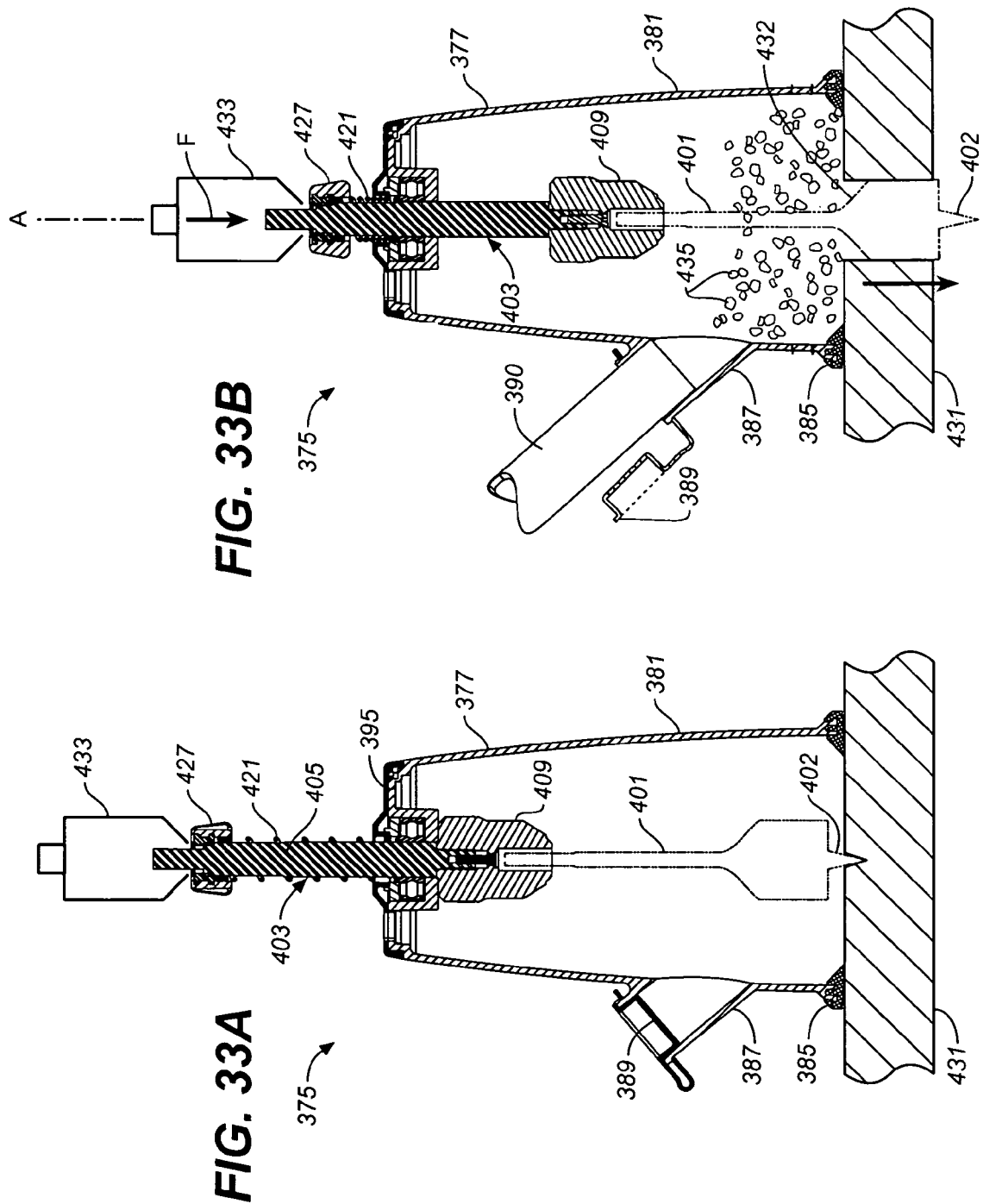

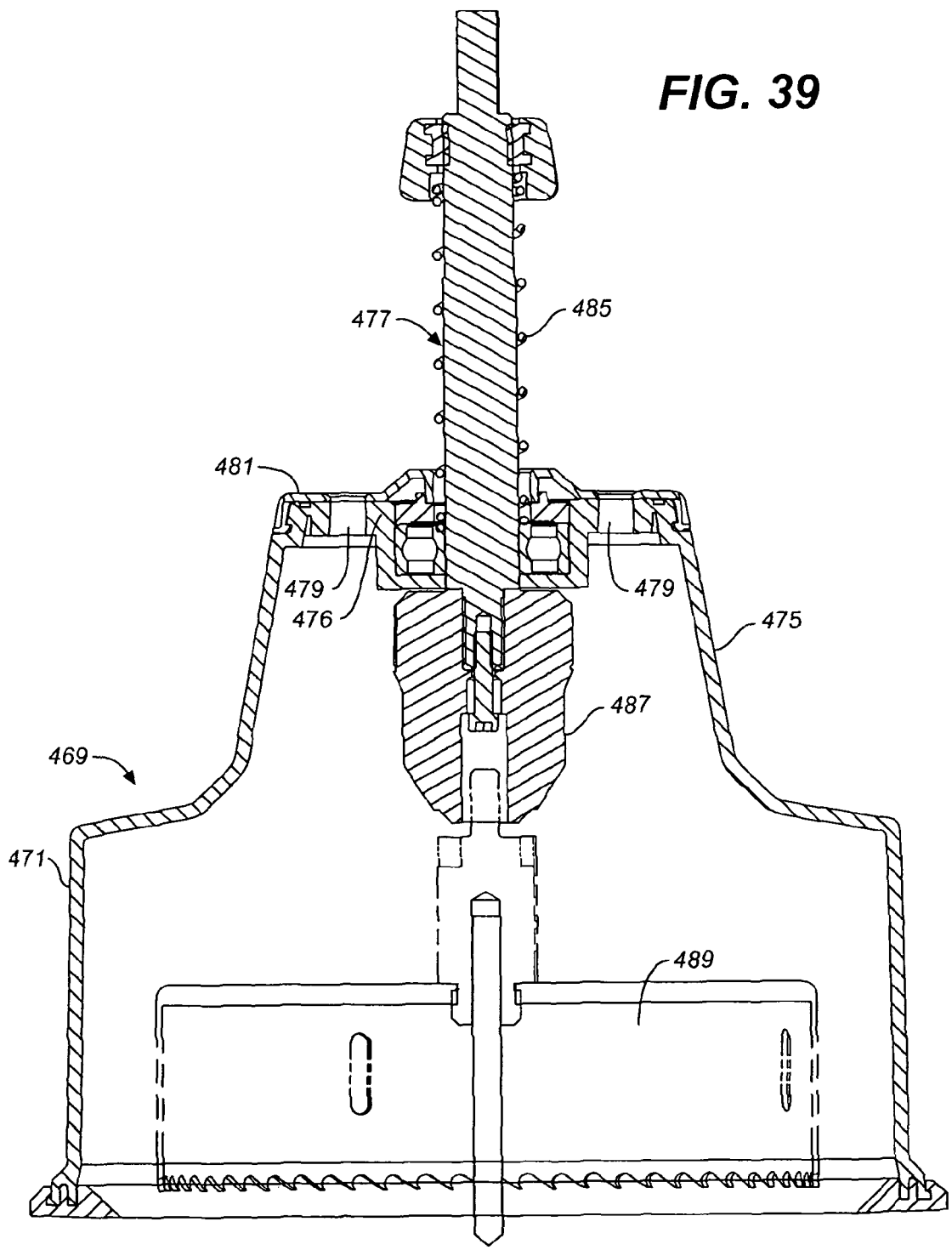

DEBRIS SHIELD FOR A ROTARY TOOL OR MACHINE

CROSS-REFERENCE TO RELATED APPLICATIONS

This application is a continuation-in-part of application Ser. No. 11/123,836, filed May 6, 2005, now abandoned, which claims the benefit of U.S. Provisional Application No. 60/569,171, filed May 7, 2004.

BACKGROUND OF THE INVENTION

The present invention generally relates to rotary tools or machine that generate debris when working on a surface, such as drilling, cutting or sanding, and more particularly relates to accessory attachments which collect debris generated by such tools or machines.

Holes are typically cut in walls and other surfaces using a hand-operated drill with cutting or drilling attachments, such as hole saws, drill bits, and spade bits having a cutting or drill end and an arbor end with a polygonal cross-section which can be gripped by a drill chuck. Because drills and other hole-cutting tools produce dust and debris during the drilling or cutting operation, shields have been designed to fit onto the drill for collecting the dust and debris as it is being generated. Typically, these collectors use a bellows cup which can flex in the axial direction as the drill or cutting tool advances into the cutting surface. One such collector is disclosed in U.S. Pat. No. 5,653,561, issued to Robert May, which discloses a bellows-shaped rubber boot that fits over the end of the drill behind the drill's rotating chuck. The boot is provided with a rubber outlet tube integrally formed in the side of the boot to which a vacuum can be connected. Other than by breaking the seal between the boot and the work surface, the boot disclosed in the May patent provides no facility for air intake or for providing air flow through the boot. The lack of air intake prevents the boot from being efficiently evacuated on a continuous basis as the cutting implement advances through the work surface.

U.S. Pat. No. 4,921,375, to Giovanni Famulari discloses a similar bellows-type collector. The Famulari collector is fitted to the frame of a drill and is provided with a relatively complicated internal impeller mechanism for moving collected debris into a collection bag. In Famulari, some air intake is provided for at the rim of the bellows by small holes around the circumference of the rim that can be easily clogged and that have no adjustment capability.

In both May and Famulari the collector bellows is designed to be an extension of the drill housing and does not provide for the accommodation of different types and sizes of tools.

The need exists for a debris shield that can be used with hand drills, rotary sanders, drill presses and the like, that is easy to use, and that can accommodate different drilling or cutting implements. A need also exists for a debris shield that can provide a vacuum port in combination with efficient and adjustable air flow within the collection chamber when the device is sealed against a work surface, and that provides for accessible and secure attachment of a vacuum hose to the vacuum port. A need still further exists for a debris shield that provides efficient sealing contact between the debris shield and the work surface.

SUMMARY OF THE INVENTION

The present invention provides a debris shield for a rotary tool that rotates a surface working implement such as a drill, spade bit, hole saw or sanding disc, and that generates debris while working on a surface, such as by sanding or cutting or drilling holes in a floor, wall or ceiling. The debris shield of the invention eliminates the need for the worker to use a protective dust mask or eye protection, and greatly reduces the need for work area preparation and clean-up normally required before and after cutting or drilling.

Briefly, the invention involves a debris shield for rotary tools having a debris collection housing that can be either a bellows housing or a rigid housing. In one aspect, the invention is comprised of a generally cup-shaped bellows housing capable of being compressed in an axial direction, and a shank-holding and vent assembly in the top wall of the bellows housing for receiving and rotatably holding the shank of a rotary surface working implement, the arbor end of which can be inserted into the chuck of a drill or the like. The shank-holding and vent assembly includes at least one vent for air intake into the collection chamber inside compressible bellows so that the collection chamber can be efficiently vacuumed out during the cutting or drilling operation. A easily accessible vacuum port is provided on the top of the bellows housing for this purpose, and suitably in a top wall of the bellows housing. Preferably, the shank-holding and vent assembly has two or more vents suitably distributed about the axis of bellows housing along which the cutting tool held by the debris shield advances. The vent or vents in the shank-holding and vent assembly of the debris shield are preferably adjustable for controlling air intake into the collection chamber or for closing the vent when the shield is used in a non-vacuum mode. The shank-holding and vent assembly can include exchangeable bushing structures, which accommodate different types and/or sizes of cutting tools. The vacuum port on the bellows housing can include a vacuum hose connector with an angled extension that can be rotated, preferably with 360, degrees of rotation.

In another aspect of the invention, the debris shield has a debris collection housing, which can be either a bellows or rigid housing. In this aspect of the invention, the debris collection housing has a top structure, an open bottom, and a compression axis which extends through the housing's top structure and bottom opening. A chuck-arbor assembly includes a chuck end, preferably with a keyless chuck, an arbor end, and is rotatably mounted in the top structure of the housing so that it lies on a rotary axis that is parallel to this compression axis. The chuck end of the chuck-arbor assembly is situated within said housing for receiving and holding the arbor end of a tool bit, and the arbor end of said chuck-arbor assembly projects above the top structure of said housing such that the arbor end of said chuck-arbor structure can be inserted into the chuck of a rotary tool such as a handle drill. This version of the invention can be provided with and without a vacuum port. In respect to the versions with a vacuum port, vent openings can be provided at the top of the debris collection housing, at the bottom of the housing, or in both locations. Preferably, these vent openings are adjustable. Adjustment of the vent openings on the top structure of the debris collection housing can be provided in the form of a vent plate and a vent cover that can be rotated on the vent plate to bring vent openings in the vent plate and vent cover into and out of registration. Adjustment of the vent openings on the bottom of the debris collection housing are most suitably used with a rigid housing, and can be provided in the form of a vent ring having vent openings which can be rotated over vent openings around a bottom perimeter wall of the housing. Also, in this version of the invention, it is contemplated that the chuck-arbor assembly could be fabricated as a unitary part.

In all versions of the debris shield of the invention, the bottom of the of the debris collection housing is preferably provided with a surface contact rim having an inner ring wall which angles inwardly from the ring's bottom contact surface to provide a dust pan effect in capturing debris produced by the drilling or cutting operation. This surface contact rim can be a separate element made of a resilient material, and can be fitted onto the bottom edge of the housing. Also, in all versions, the debris collection housing is preferably fabricated, at least in part, of a substantially clear material, so that the user can see the encased cutting tool or drill and the progress of the cutting or drilling operation.

In all versions of the invention having a vacuum port, the vacuum port will preferably be provided with a port closure cap, and means for holding the closure cap to the vacuum port. Means for locking the vacuum hose in the shield's vacuum port are also preferably provided.

Further novel aspects of the invention will be apparent from the following description of the illustrated embodiments, which are believed to be the best mode of the invention. It is contemplated that the invention would be used with hole saws, drill bits, spade bits and the like, however, it will be appreciated that the invention can be used with other rotary tools.

DESCRIPTION OF THE DRAWINGS

FIGS. 33A and 33B are cross-sectional views thereof showing the advancement of the chuck-arbor assembly during a drilling operation.

FIG. 39 is a cross-sectional view thereof in side elevation.

DESCRIPTION OF THE ILLUSTRATED EMBODIMENT

Figure 1:
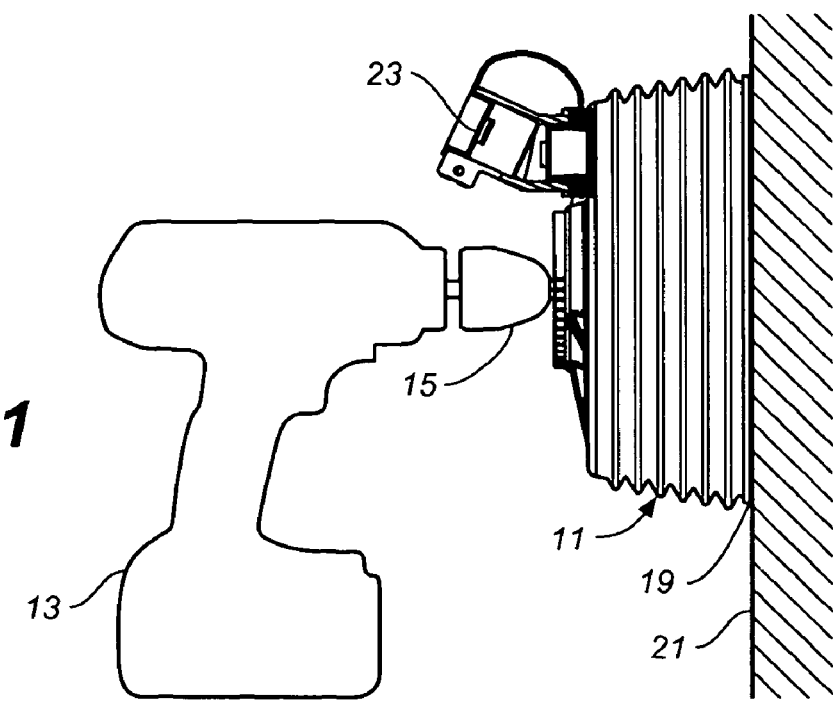
FIG. 1 is a pictorial view of one embodiment of a debris shield in accordance with the invention being used with a hand drill and hole saw against a vertical wall surface.
Figure 1A:
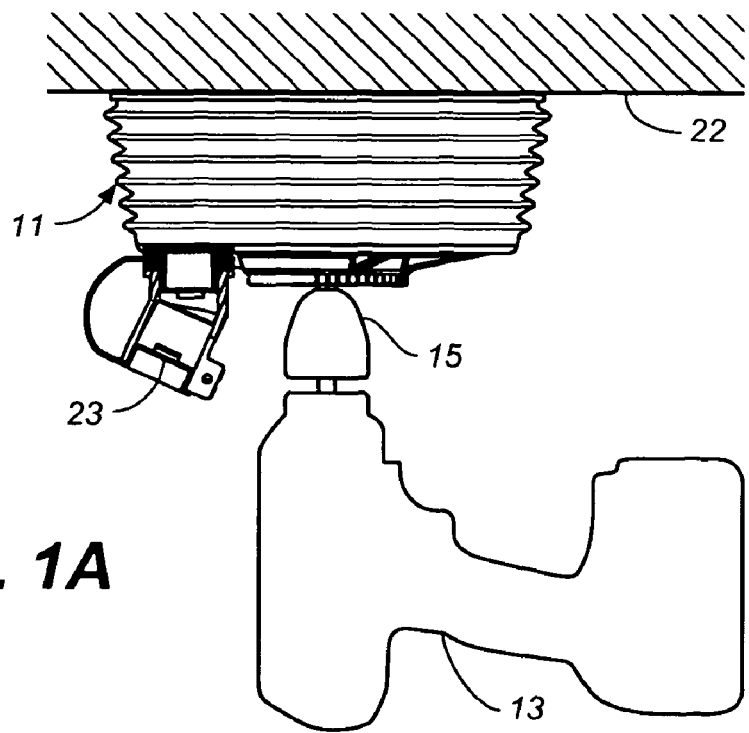
FIG. 1A is a pictorial view of the debris shield, hand drill and hole saw shown in FIG. 1 used against a horizontal surface, such as a ceiling surface.

Referring now to the drawings, FIGS. 1 and 1A generally show how a debris shield in accordance with the invention, such as debris shield 11, is used with a hand drill 13 when cutting or drilling holes in a vertical or horizontal surface to shield the worker and surrounding work area from debris generated during the cutting operation. The other later-described embodiments of the invention would be used with a hand drill in a similar manner. The debris shield holds and covers a cutting or drilling implement (not shown and sometimes generically referred to herein as rotary surface working implements) having an arbor end that projects from the top of the drill shield and that is inserted into and held by the chuck 15 of hand drill 13. The illustrated debris shield includes a debris collection housing in the form of bellows housing 17, which has an open end and surface contact rim 19. When cutting or drilling a hole, the housing's surface contact rim is placed against a work surface, such as vertical wall 21 as illustrated in FIG. 1 or horizontal ceiling 22 as illustrated in FIG. 1A, and creates a seal against the work surface. Because it surrounds the cutting implement held in the drill chuck, the bellows housing will collect debris coming off the work surface that would otherwise fall or be projected onto the worker or into the work area. Thus, debris can either be removed from the bellows after the drilling or hole cutting operation is complete, or vacuumed out of the bellows housing by a vacuum hose attached to the shield's vacuum port 23. It is understood that the uses for the debris shield of the invention shown in FIGS. 1 and 1A are illustrative only, and that the invention can be used with other machines and tools having rotary working implements that generate debris, such as, for example, a drill press. It shall also be understood that reference to "debris" collected by the various versions of the debris shield of the invention shall include all forms of material that may come off a surface being cut or drilled, including dust, dirt, shavings, chips and splinters.

Figure 9:
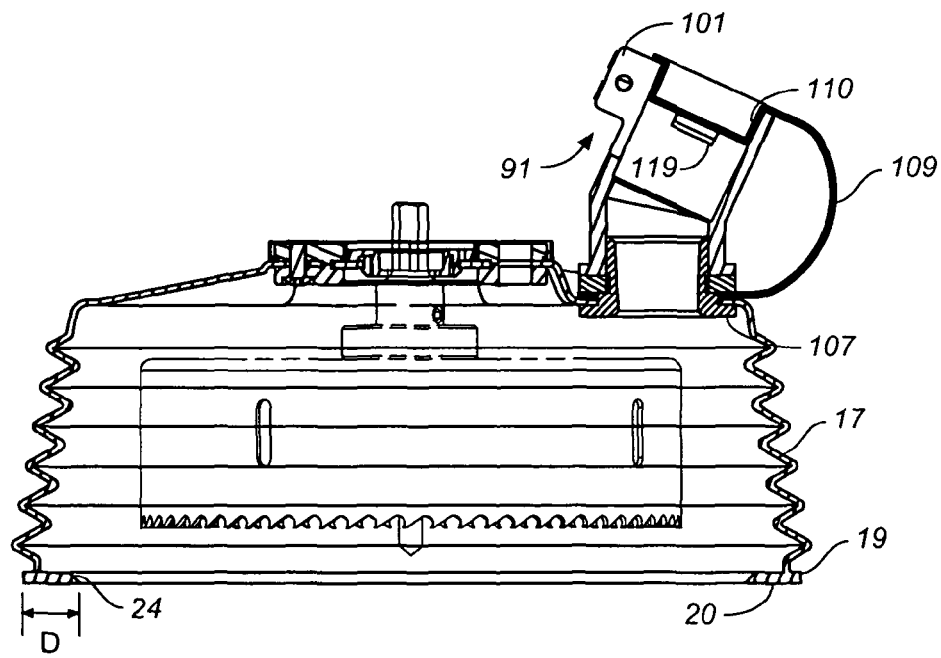
FIG. 9 is a cross-sectional view thereof taken along lines 9-9 in FIG. 7.

FIGS. 2-11 show in greater detail debris shield 11, which is particularly adapted for use with a hole saw. The shield's bellows housing 17 is generally cup-shaped and has a bellows sidewall 25 that extends from the top to the bottom of the bellows housing, that is, from top wall 27, to bottom surface contact rim 19. The bellows sidewalls allow the debris shield to compress along its compression axis (denoted by the letter "A" in FIGS. 2 and 3) as the hole saw advances into the work surface. In this embodiment, the surface contact rim, which remains in contact with the work surface throughout the cutting operation, is formed by an in-turned lip 20 of the housing sidewall. As best shown in FIG. 9, this lip preferably has an interior edge 24 that angles inwardly, suitable at about forty-five degrees, toward the bottom surface of the rim to provide a "dust pan" contact with the work surface.

The surface contact rim 19 provides a seal between the debris housing and the work surface, and catches debris as the shield is pulled away from a vertical work surface. The lip's inwardly angled dust pan edge tends to prevent debris from building up along this edge that might drop out of the housing. To provide a lip of sufficient width to achieve these objectives, the width of the lip (denoted D in FIGS. 9 and 13) can suitably be approximately ⅝ of an inch. Also, to improve surface sealing, the lip can be angled slightly outwardly away from the top of the bellows housing as it extends inwardly toward the center of the housing.

The bellows housing is suitably a molded part of a suitable elastomeric material, such as polyurethane or silicone rubber, which is preferably transparent, or substantially transparent, to permit the user to see through the bellow housing. Radial ribs 29 formed into the bellows top wall 27 and distributed around the axis of the bellows housing provide the bellows housing with greater lateral rigidity, that is, rigidity in a direction transverse to the housing's compression axis A. A raised center mounting portion 31 formed in the bellows housing top wall is reinforced by radial ribs 29 and has an inwardly projecting perimeter mounting platform 33 perpendicular to the bellows' compression axis for mounting a shank-holding and vent assembly to the bellows as hereinafter described.

While the bellows housing is shown as having a circular geometry about the compression axis, the invention is not limited to such a geometry. Also, while the bellows housing is described as being suitably fabricated as a single part, it would be possible to fabricate the housing in more than one section of the same or different materials. For example, top wall 27 of the housing might be fabricated of metal or rigid plastic material and the bellows side walls of flexible plastic material such as polypropylene. With such a construction, the top wall of the housing would provide greater lateral rigidity to the debris shield.

Figure 2:
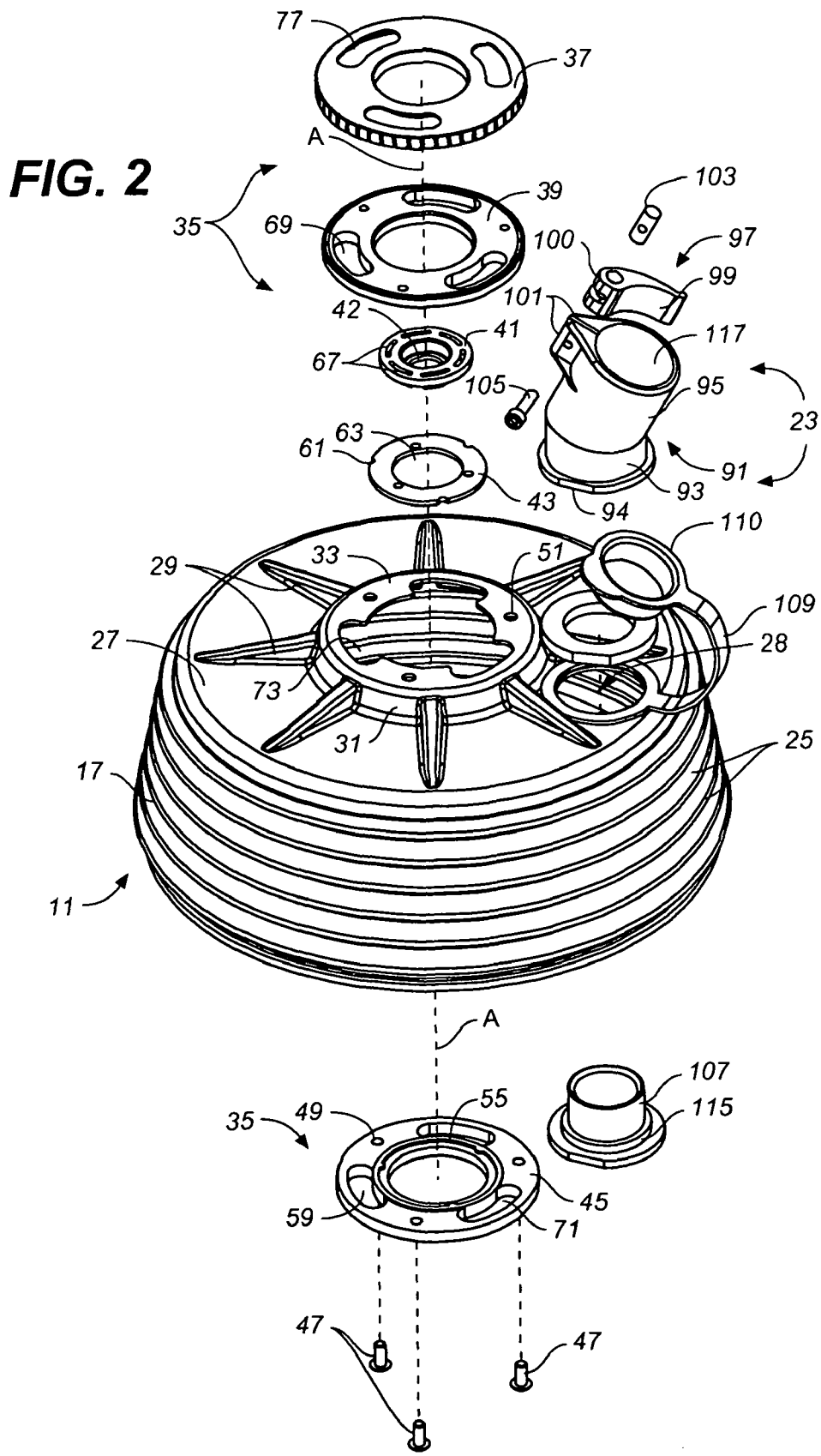
FIG. 2 is an exploded top perspective view of a debris shield on the embodiment of the invention adapted for use with a hole saw.
Figure 3:
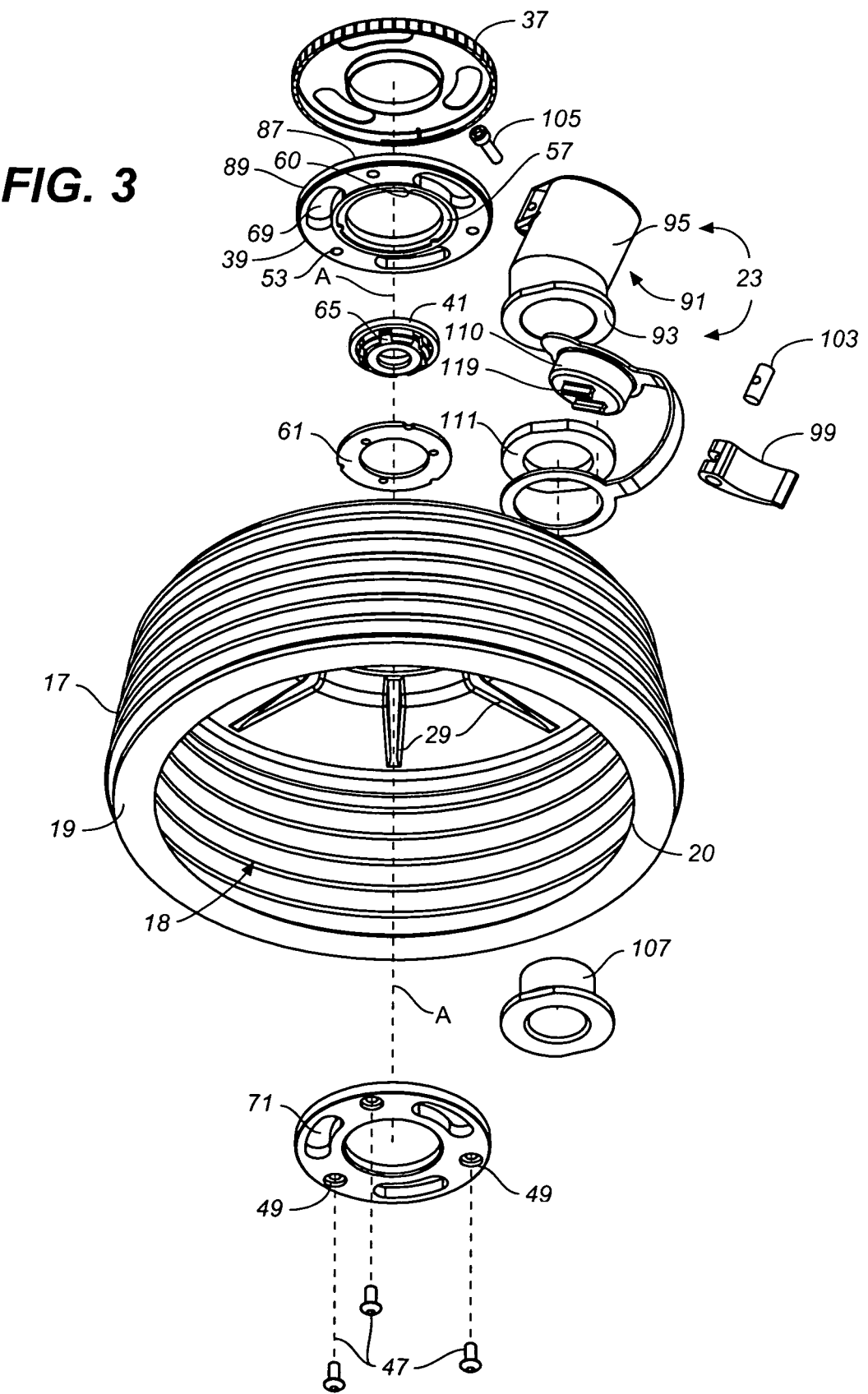
FIG. 3 is an exploded bottom perspective view of the debris shield shown in FIG. 2.
Figure 4:
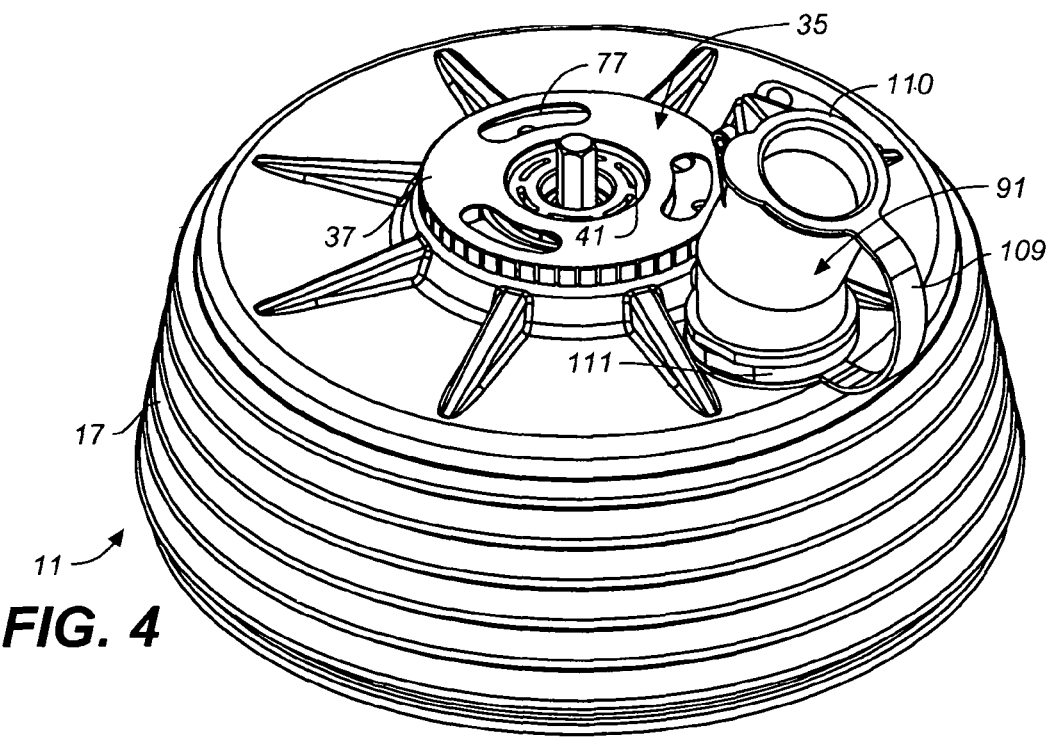
FIG. 4 is a top perspective view of the debris shield shown in FIG. 2 fully assembled.
Figure 10:
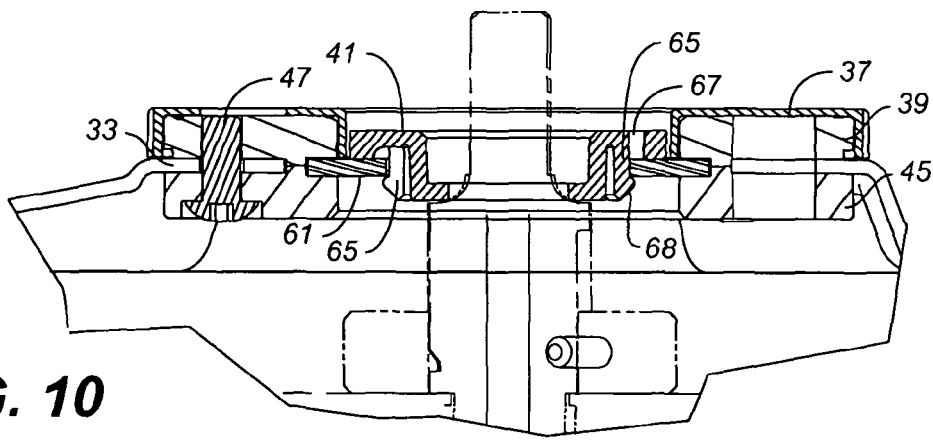
FIG. 10 is an enlarged fragmentary cross-sectional view thereof showing the assembled shank-holding and vent assembly in greater detail.

The debris shield shown in FIGS. 2-11 further includes a shank-holding and vent assembly 35, which mounts to the raised mounting portion 31 of bellows housing 17. As best shown in FIGS. 2, 3, and 10, the shank-holding and vent assembly includes, from top to bottom, a vent adjustment cover 37, upper vent plate 39, arbor bushing 41, arbor bushing retainer plate 43, and lower vent plate 45. These parts are assembled together and secured to the perimeter mounting platform 33 of a raised center mounting portion of the bellows housing by means of mounting screws 47, which, after being inserted through counter-bored holes 49 in the lower vent plate and then through holes 51 in the housing's mounting rubber wall, screw into tapped hole 53 on the bottom of the upper vent plate. In its assembled state it can be seen that the perimeter mounting platform 33 of the top wall's raised portion 31 is sandwiched between the upper and lower vent plates of the assembly and that the assembly is supported and centered within the housing by this raised platform.

The top of the lower vent plate 45 and the bottom of the upper vent plate 39 each have a raised interior wall which forms an inner retention area (denoted, respectively, by the numeral 55 in FIG. 2 and numeral 57 in FIG. 3) for receiving and holding the bushing retainer plate 43 when the parts are assembled. Small projections 59, 60 on the raised interior wall forming retention areas 55, 57 correspond to and engage notches 61 in the perimeter of the bushing retainer plate to prevent the retainer plate from rotating within the vent plates. The bushing retainer plate, in turn, receives and retains arbor bushing 41, which snaps into center opening 63 of the retainer plate and is thereby locked onto the plate. A snap lock structure is provided on the arbor bushing in the form of axially projecting and depressible tabs 65, which are immediately inside tab relief slots 67, and which lie on a circle that corresponds to the diameter of the center opening of the retaining plate. As best illustrated in FIG. 10, locking ridges 68 at the end of the tabs prevent axial dislodgment of the bushing.

The upper and lower vent plates 39, 45 of the shank-holding and vent assembly 35 are seen to include vent openings in the form of aligned vent slots 69, 71, which line up with cut-outs 73 in the inwardly projecting mounting platform 33 of the raised center mounting portion of the bellows housing. These slots and the cut-outs in the perimeter mounting platform at the top of the bellows housing provide vents through the top wall structure of the debris collection housing around the housing's center axis, and will allow air to flow into the debris shield's collection chamber 18 when a vacuum is drawn through vacuum port 23. Air intake through the vents is adjustable by means of vent cover 37.

Figure 5:
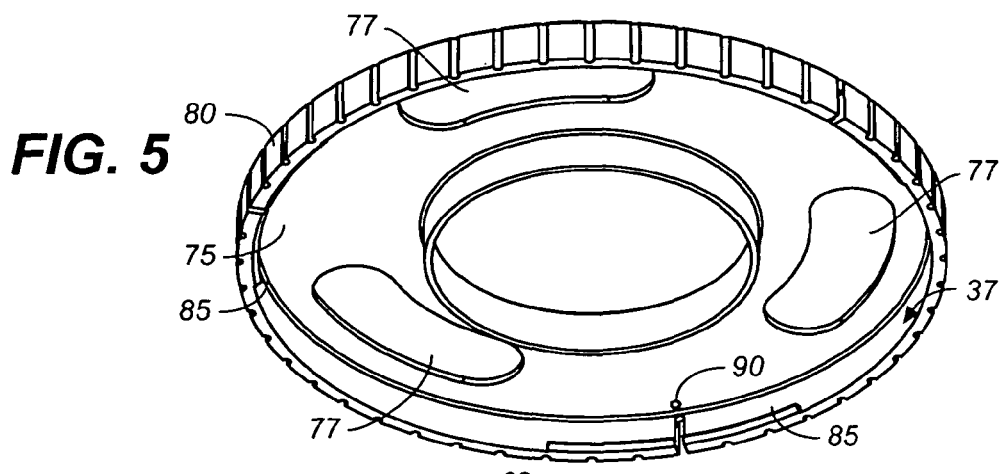
FIG. 5 is a bottom perspective view of the vent cover of the shank-holding and vent assembly of the debris shield shown in FIG. 2.
Figure 6:
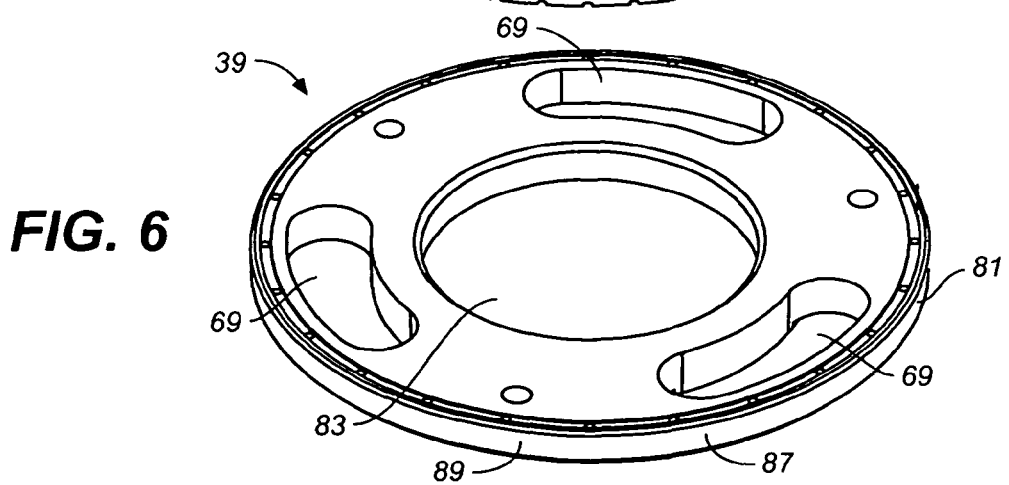
FIG. 6 is a top perspective view of the upper ring of the shank-holding and vent assembly of the debris shield assembly shown in FIG. 2.
Figure 7:
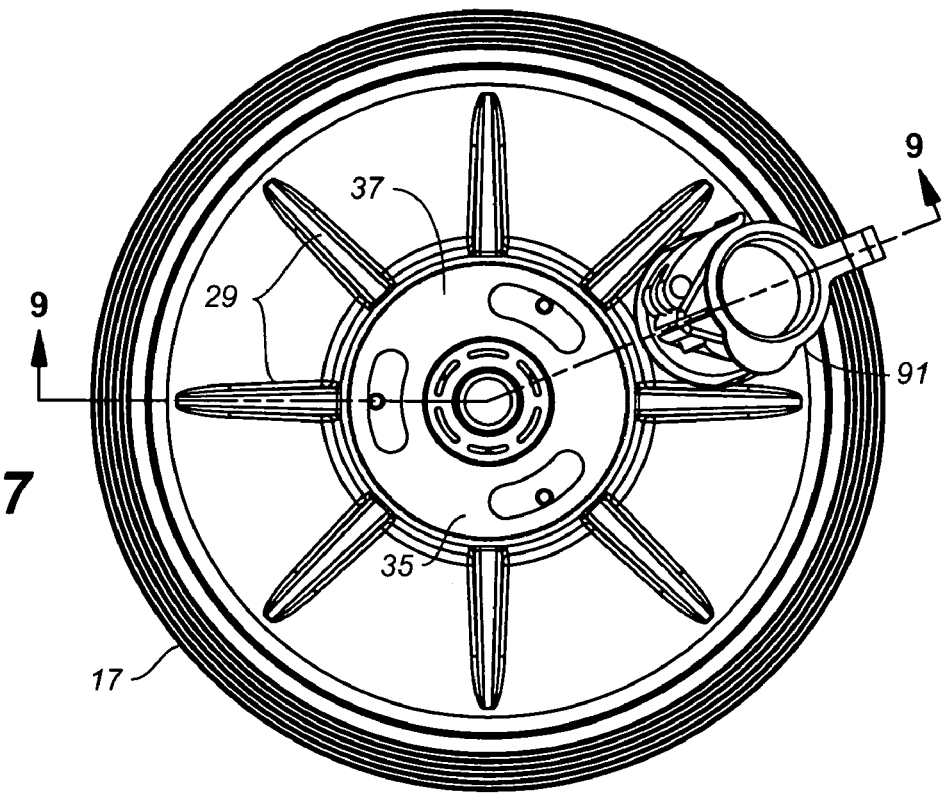
FIG. 7 is a top plan view of the debris shield shown in FIG. 2 fully assembled.
Figure 8:
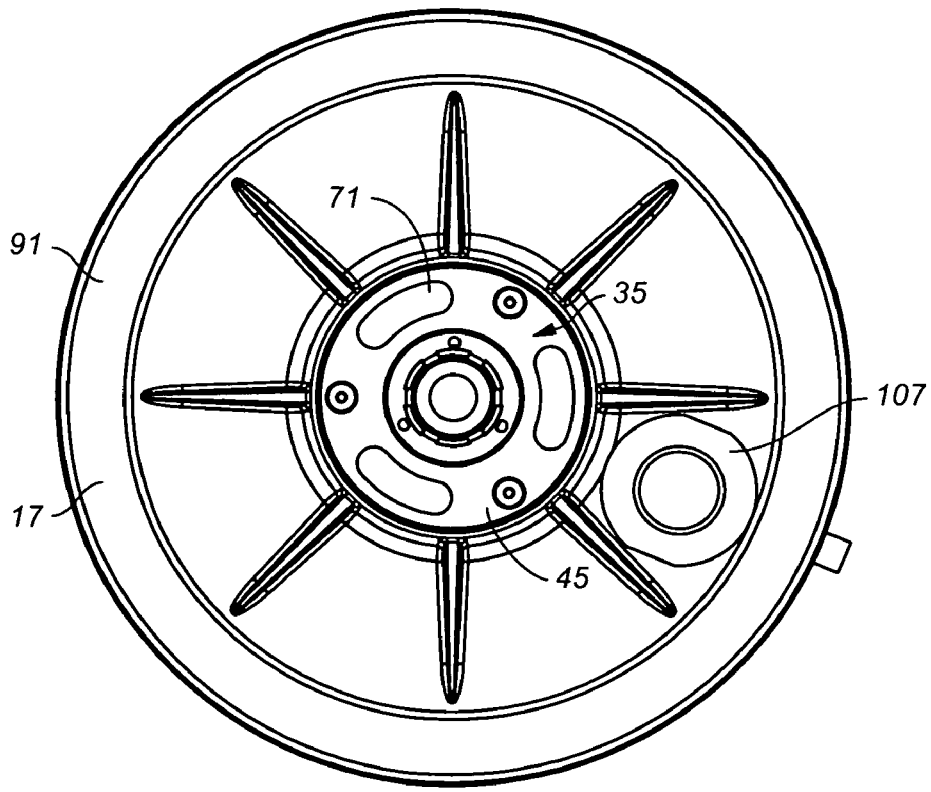
FIG. 8 is a bottom plan view thereof.

As best seen in FIG. 5, the vent cover includes a top wall 75, vent openings in the form of vents slots 77 in the top wall, an axially extending inner sleeve 79, and a knurled outer rim 80 for gripping that extends down from the top wall. The vent cover is sized such that its outer rim fits over the outer perimeter 81 of the upper vent plate, and such that its inner sleeve slides through the upper vent plate's center opening 83. Small inwardly projecting lips 85 at the bottom of the vent cover's outer rim snap over the outer perimeter of the upper vent plate and hold the vent cover on the upper plate by engaging a small groove 87 (see FIG. 3) formed at the bottom corner of the upper plate's perimeter wall 89. By rotating the vent cover on the upper vent plate, the vents slots in the cover can be positioned relative to the aligned vent slots in the upper and lower vent plates. This will allow air flow through the top of the debris collection housing to be adjusted. Maximum flow is achieved when the slots in the cover vent precisely overlap the vent plate slots. Lower airflow can be achieved when the cover is rotated so that its vents only partially overlap. Air flow is shut off altogether by turning the cover vents so that there is no vent opening overlap. One or more small indexing bumps 90 on the underside of the cover top wall 75 near perimeter wall 80 engage indexing holes or dimples 93 uniformly spaced around the perimeter of the upper vent plate so that the vent cover can be rotated on the plate in discreet indexed turns. Slot 95 in the perimeter wall of the vent cover provides a visual indication of the rotational position of the cover.

Most of the parts of the shank-holding and vent assembly 35 can suitably be of polycarbonate, Nylon®, Delrin® or other durable plastic material. However, arbor bushing retainer plate 43 will preferably be a metal part so that a thin retainer plate may be used having suitable strength. Generally, it is desirable to keep the overall assembly as thin as possible to minimize the length of the arbor which is captured by the assembly. It is noted that the preferably plastic arbor bushing 41, which removably snaps into the metal retainer plate, can be provided in different sizes, that is, with different sized center openings 42, to accommodate different arbor sizes of different standard hole saws. Thus, different sized hole saws can be used with the same debris shield by simply replacing the bushing.

The shield's vacuum port 23 is provided by a vacuum port assembly detachably connected to an opening 28 in the bellows top wall 27 between ribs 29a, and 29b. The port assembly is seen to include hose connector 91 having an internally threaded base 93, an angled top, preferably split wall extension 95, and a clamping mechanism 97 on the split wall extension for clamping the extension onto a vacuum hose (not shown) which is inserted into the end of the extension. The clamping mechanism is actuated by cam lever 99 having a clevis end 100 attached to the back of opposed crimping flanges 101 formed along the split of the split wall extension.

The cam level, which rotates on a cylinder nut 103 in the cam lever's clevis end, is held in place at the back of the crimping flanges 101 by hex head screw 105. This hex screw screws into the cylinder nut through the crimping flanges.

The vacuum port assembly further includes a threaded nipple 107, a strap 109 with a port closure cap 110, and lock nut 111. From inside the bellows housing, the nipple inserts through both the opening 28 in the bellows top wall 27 and the ring end 113 of strap 109. After the lock nut is tightened, the base end of the hose connector 91 is screwed into place onto the nipple. A bearing collar 115 of sufficient height projects through the bellows top wall to allow the vacuum port assembly to rotate within the top wall opening. This feature allows the hose connector of the vacuum port assembly to be rotated a full 360, degrees on the bellows housing during use, such that the angled extension can be swiveled to an optimum position for accommodating the vacuum hose connected to the port. When the vacuum port is not in use, the port closure cap at the free end of strap 109 can be inserted into the port opening 117 of the hose connector to close off this opening. Otherwise, the closure cap can be clipped onto the strap itself by means of strap clip 119 integrally formed on the back of the cap (see FIG. 3).

Figure 11:
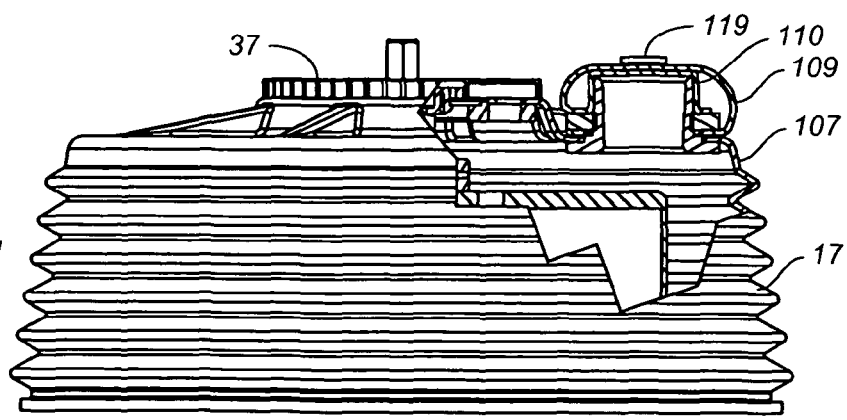
FIG. 11 is a broken-away view thereof in side elevation showing the vacuum port removed and vacuum port cap strap reversed to allow the vacuum port cap to cover the vacuum port nipple.

FIGS. 1 and 11 show the debris shield with the hose connector of the vacuum port assembly removed. In applications where the vacuum port feature is not desired, or where it is desired to package the debris shield with the hose connector 91 detached from the bellows housing, the hose connector is simply removed from nipple 107 and the port closure cap 110 is folded under the strap so that its open cup side faces down toward the top of the bellows housing instead of away from it. (The strap needs to be of sufficient length to allow the cap to fold under like this.) As best seen in FIG. 11, the folded-under cup side of the port closure cap can now be pressed over the end of the nipple with the extra length of the strap being snapped into the strap clip 119 on the reverse side of the cap to hold the strap down.

It is contemplated that the debris shield of the invention can be supplied to the end user with the shank-holding and vent assembly 35 pre-assembled on the bellows housing, except possibly for arbor bushing 41. As above-mentioned, it is further contemplated that a set of arbor bushings can be supplied with the shield, any one of which can be selected by the end user according to the size of hole saw to be used.

To use the debris shield, the end user snaps the selected arbor bushing into arbor bushing mounting plate 43, and, if necessary, installs the hose connecter by screwing it down onto nipple 107. Wrenching flats 94 are provided on the connector base to permit further tightening of the connector. The user now passes the arbor end of the hole saw through the arbor bushing from the open end of the bellows housing, and inserts it into the chuck of the hand drill 13, which is tightened to secure the arbor. The shield is then used as above-described and illustrated in FIGS. 1 and 1A. Before or during use, the air intake can be adjusted by rotating vent cover 37. Where no vacuum is used, the vent cover would normally be closed.

The vents provide an additional advantage in that they can be opened to allow access to the collection chamber 18 with a screwdriver or similar implement to dislodge plugs in the hole saw. Often when cutting a hole a slug gets caught in the hole saw and must be removed. The backs of the hole saw will normally have openings for this purpose; the plugs are simply punched out from the back of the cutting tool. Using the vents of the shield of the invention, the plugs can easily be punched out through the rear of the shield without having to remove the tool from the drill.

Figure 12:
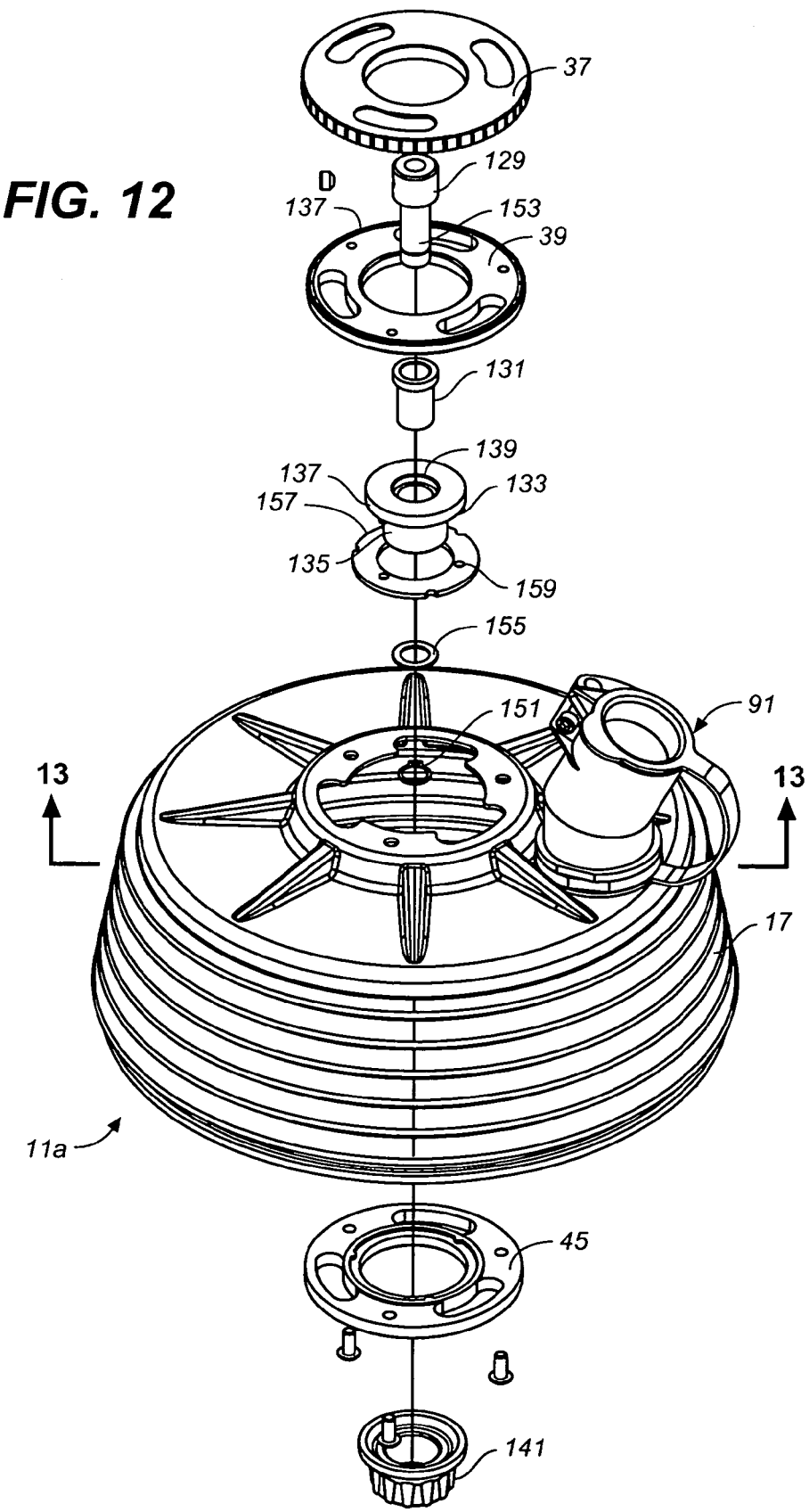
FIG. 12 is a top perspective exploded view of debris shield in accordance with the invention adapted for use with a spade bit.
Figure 13:
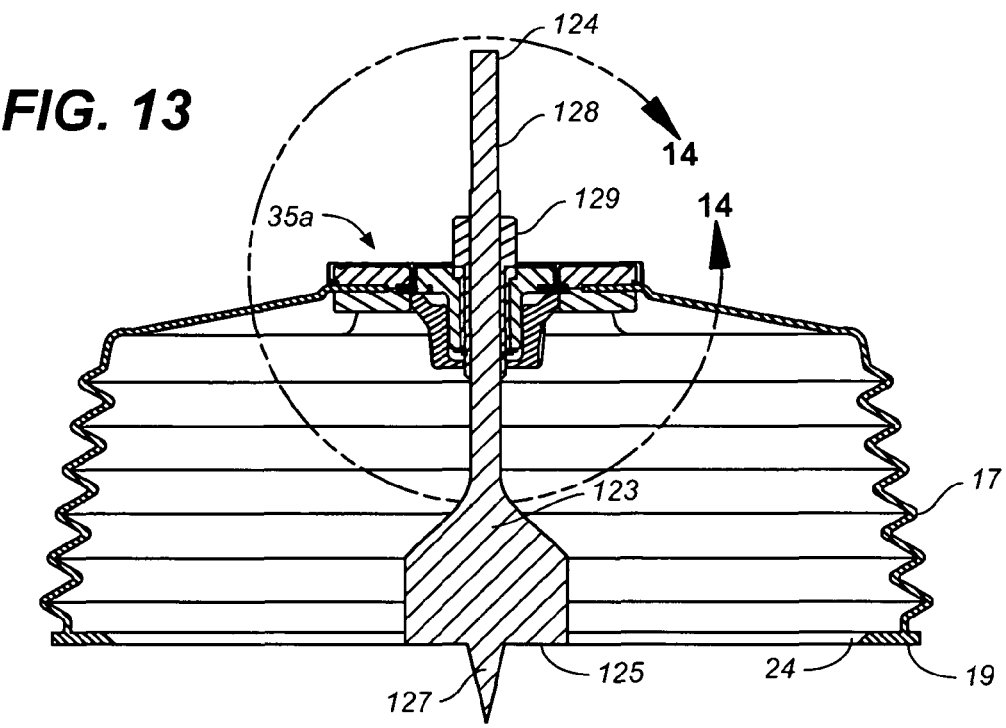
FIG. 13 is a cross-sectional view in side elevation of the debris shield shown in FIG. 12 fully assembled and taken along lines 13-13 of FIG. 12.
Figure 14:
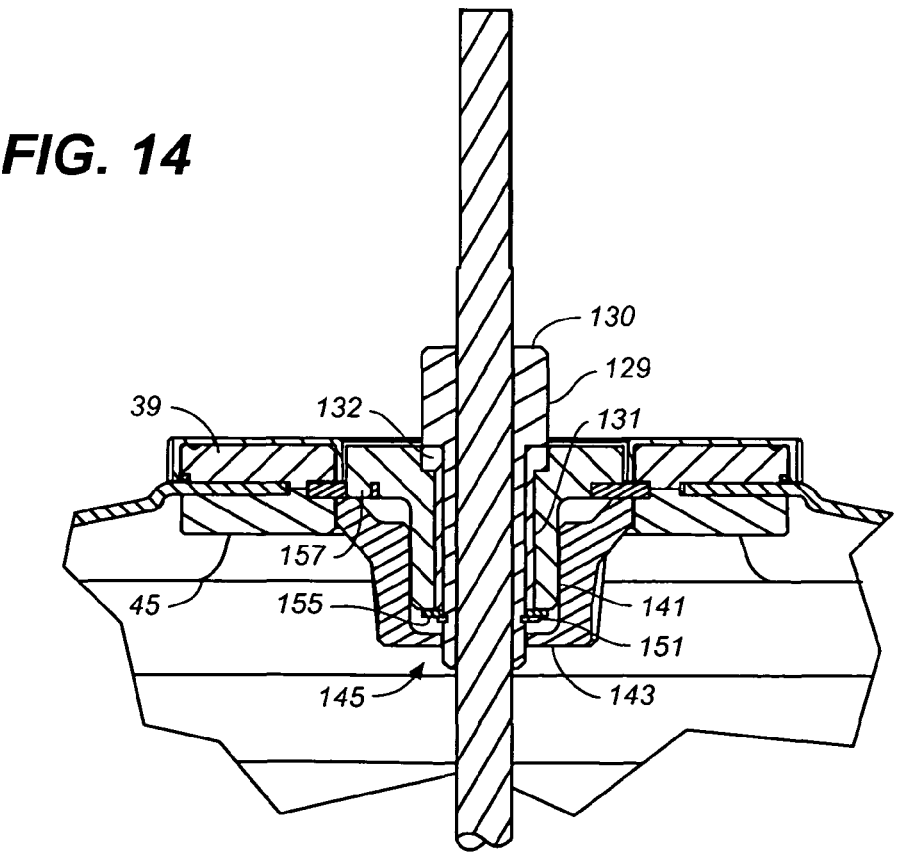
FIG. 14 is an enlarged fragmentary cross-sectional view thereof showing the shank-holding and vent assembly of this embodiment in greater detail.

FIGS. 12-14 illustrate an alternative embodiment for the shank-holding and vent assembly (denoted 35*a*) which is particularly adapted for use with a spade bit. Here the snap-in arbor bushing 41 shown in the previous embodiment (FIGS. 2-11) is replaced with a spade bit sub-assembly designed to fix the axial position of the spade bit relative to the shield's bellows housing. The debris shield is otherwise identical to the embodiment illustrated in FIGS. 2-11. As best illustrated in FIG. 13, it is desirable to fix the axial position of the spade bit 123 such that its cutting edges 125 do not project beyond the bellow's surface contact rim 19. As shown, the spade bit's pilot tip 127 projects beyond the surface of contact rim 19 of the shield's bellows housing 17. Thus, the bellows housing will begin to compress along the axis of the shield when the spade bit cutting edges begin cutting into the work surface. The shield can suitably be positioned further down on the spade bit shaft to cover the pilot tip; however, allowing the cutting edges to extend beyond the bellow's rim should be avoided.

The spade bit sub-assembly includes shaft sleeve 129 with an enlarged top end 130, a bearing insert 131 with an enlarged top end 132, a shaft bushing 133 having a threaded end 135 and a larger diameter collar 137 with a top recess 139, and a cap nut 141 having a transverse cap wall 143 with a center opening 145. The extended smaller diameter end 147 of the shaft sleeve slides into and projects through the bottom of the bearing insert, which is preferably press fit into the center hole 149 of the shaft bushing. When completely inserted, the enlarged top of the bearing rests in the bushing's top recess, while its smaller-diameter end extends to the bottom of the arbor bushing. Retaining ring 151, which snaps into the retaining ring groove 153 at the bottom end of shaft sleeve behind washer 155, locks the shaft sleeve and bearing insert to the shaft bushing, permitting the sleeve to rotate within the bearing insert. It is seen that the shaft bushing rests on arbor plate 43 and is prevented from rotating by pins 157 that fit into holes 159 in the arbor plate. The cap nut 141 screws onto the threaded end 135 of the arbor bushing to hold the assembly to the arbor plate. It is noted that, when the cap nut is screwed on, the small-diameter end of the sleeve projects through the center opening of the cap nut.

The bearing insert of the spade bit sub-assembly will preferably be made of a durable plastic, such as polycarbonate plastic, or of bronze metal. Shaft sleeve 129, retaining ring 151 and washer 155 are preferably metal; for example, a high carbon or mild steel.

It is contemplated that the debris shield 11*a*, shown in FIGS. 12-14 will be supplied with a spade bit sub-assembly pre-assembled, but not installed in the shield. However, this sub-assembly could be pre-installed. It is also noted that, since most spade bits have shafts of the same diameter, a single spade bit sub-assembly should accommodate most spade bit sizes.

To use the spade bit version of the debris shield shown in FIGS. 12-14, the user need only secure the spade bit sub-assembly in the shield as needed and as above-described, and then insert the arbor end 124 of spade bit 123 through the cap nut opening 145 into the shaft sleeve 129. The spade bit is then pushed up through the shaft sleeve until the desired position is achieved, that is, where the cutting edges of the spade bit are in or above the plane of the bellows' contact rim 19. When in the desired position, set screw 130 in the side of the shaft sleeve is screwed down to lock the spade bit in place.

It is noted that by providing a bellows housing fabricated of a clear material as above-described, the user of the debris shield of the invention will be able to observe the cutting tool during the entire cutting process. This feature of the invention will allow the user to precisely locate the cutting tool on the work surface before actuating the drill, and to better control the cutting operation, making it easier to keep the cutting tool perpendicular to the surface.

Figure 15:
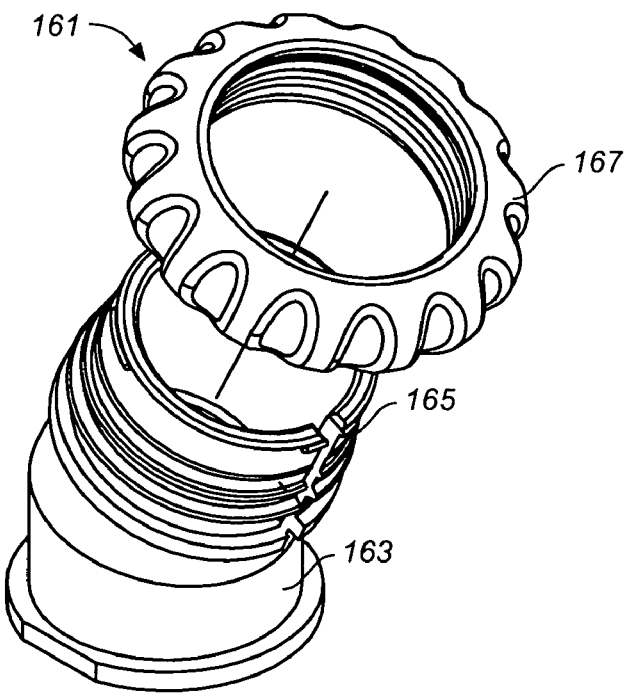
FIG. 15 is a top perspective view of an alternative embodiment of the vacuum port of the debris shield shown in the previous figures.
Figure 16:
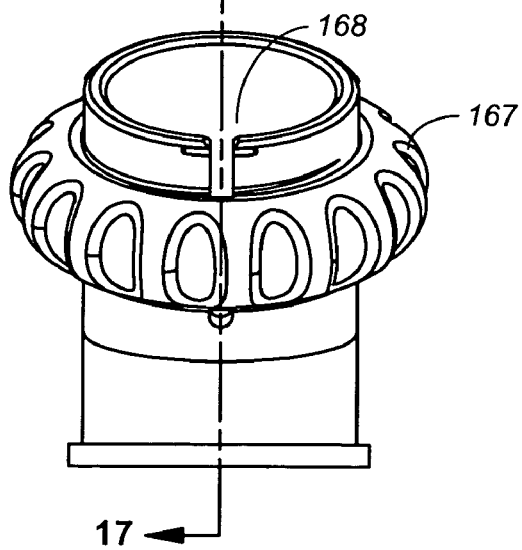
FIG. 16 is a front elevational view thereof.
Figure 17:
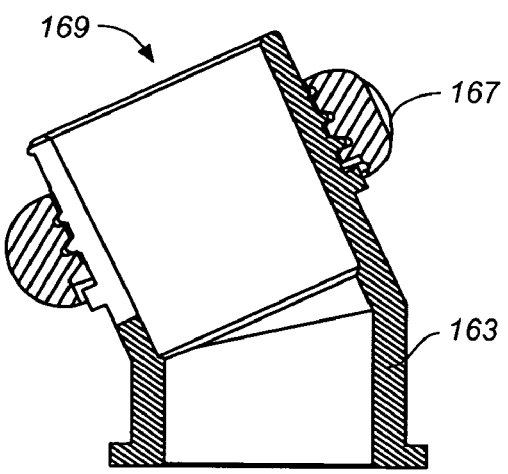
FIG. 17 is a cross-sectional view thereof taken along line 17-17 of FIG. 16.
Figure 18:
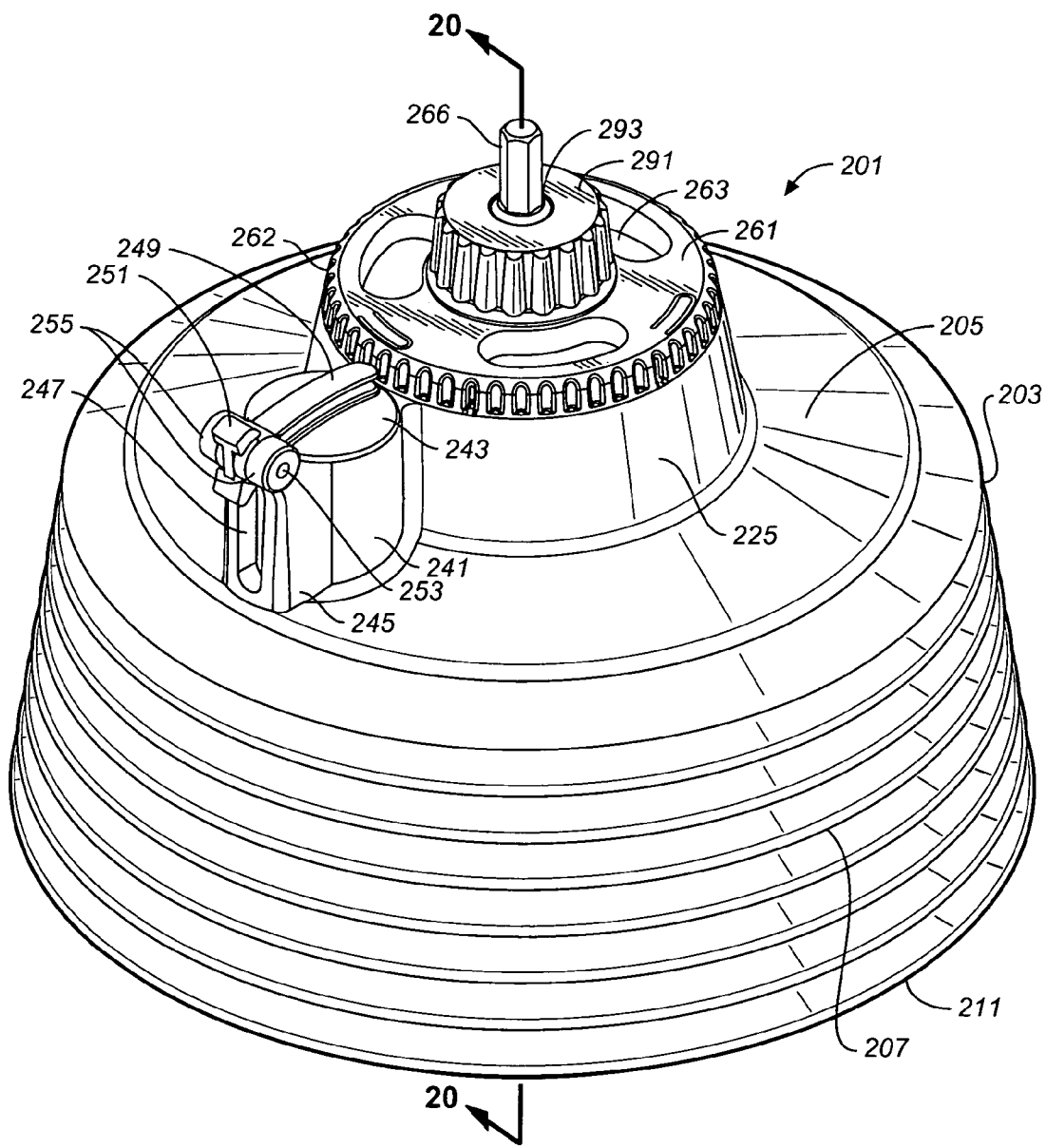
FIG. 18 is a top perspective view of another embodiment of a debris shield of the invention wherein the debris shield has a chuck-arbor assembly for providing a secondary chuck in the debris collection housing.
Figure 19:
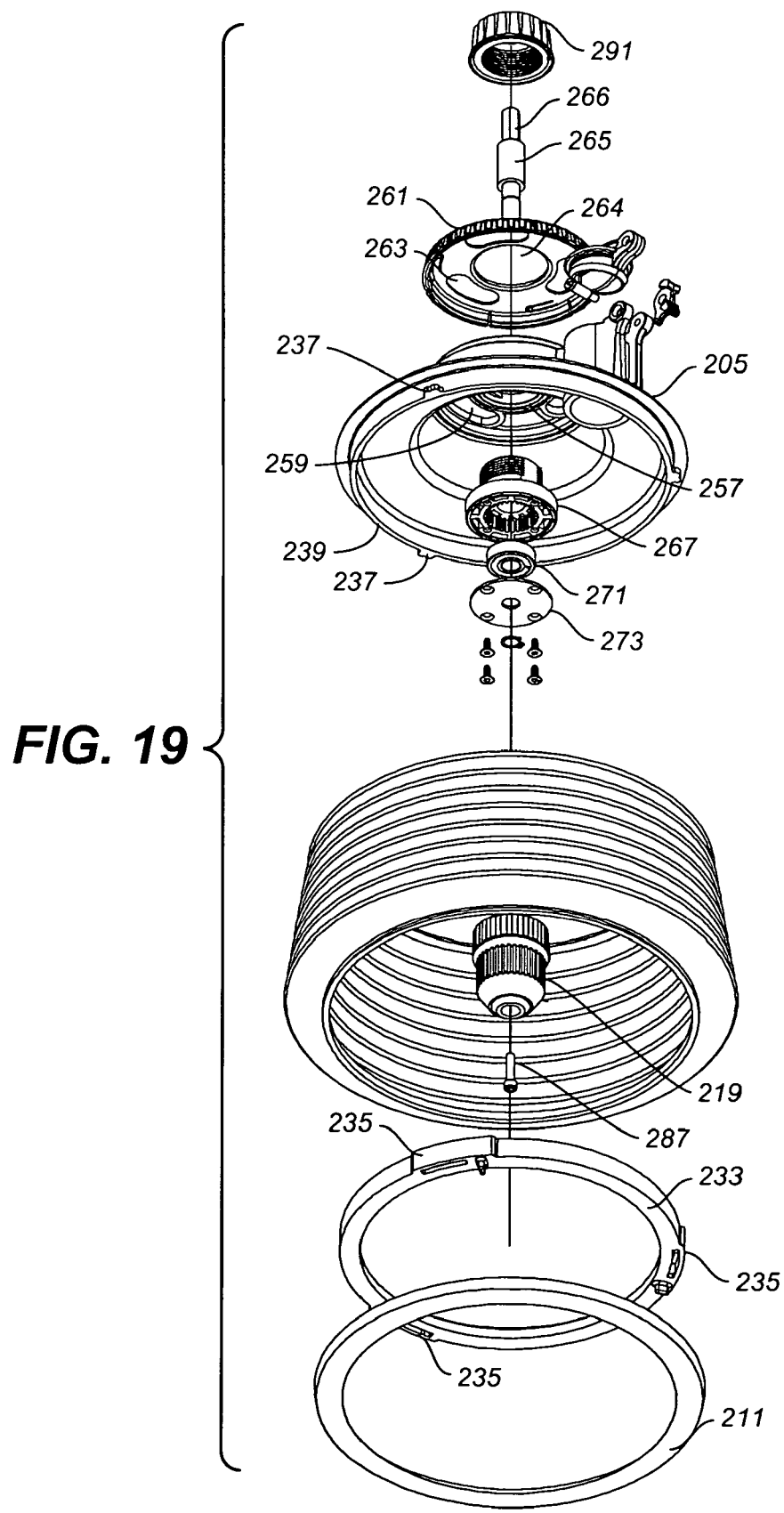
FIG. 19 is an exploded bottom perspective view thereof.

FIGS. 15-17 illustrate an alternative to the design for the vacuum hose connector 91 shown in the previous figures. In this case, hose connector 161 includes an internally threaded base 163 and an angled split wall extension 165 sized to receive the end of a vacuum hose (not shown). The split wall extension has progressive diameter external threads for receiving an internally threaded clamping ring 167. As it screws onto the progressive threads of the split wall extension, the clamping ring will force the walls of the extension together at split 168 to clamp the end of a hose inserted into the extension's open end 169.

Vacuum port connector 161 is installed on the debris shield in the same manner above-described in connection with vacuum port connector 91, using the same nipple 107, the same strap and port closure cap 109, 110, and the same lock nut 111. Like connector 91, vacuum port connector 161 can also easily be rotated on the bellows housing due to the nipple's bearing collar 115.

FIGS. 18-40A illustrate embodiments of the invention wherein a secondary chuck is provided within the debris collection housing by means of a chuck-arbor assembly. The embodiments hereinafter described include two different approaches to providing compression along a compression axis of the debris shield for advancing a rotating drilling or cutting tool. The following embodiments also include debris shields with and without vacuum ports, and debris shields with vacuum ports having different venting schemes. While the chuck-arbor assembly described below is described as a assembly of parts, it may be possible to provide a unitary chuck-arbor assembly. Thus, it shall be understood that references herein to chuck-arbor "assembly" are not intended to exclude a unitary construction.

Turning to FIGS. 18-20A, the shown debris shield 201 includes a debris collection housing 203 having a rigid top structure in the form of top cover 205, which can be fabricated of polycarbonate or other lightweight rigid plastic material, and resilient bellows side walls 207 depending downwardly from the top structure to form a debris collection chamber 209. A resilient surface contact rim 211 fits onto the bottom end 213 of the bellows side walls at the perimeter of the housing's bottom opening 215. This resilient rim element, which can be suitably fabricated of a rubber material such as urethane, is suitably provided with a grooved top surface 212 for receiving the side wall's down-turned bottom edge 214. The resilient rim will provide sealing contact with the work surface onto which the debris shield is placed, thereby preventing leakage of debris through this contact. It also has an angled dust-pan interior edge 210, as earlier described. It shall be understood that, while the surface contact rim described herein is considered the best mode of the invention, surface contact rims could be provided in other forms, including a surface contact rim that is simply formed by the bottom of housing wall.

The top cover of the debris shield holds a chuck-arbor assembly 217, described in more detail below, and provides a secondary chuck 219 in the debris collection housing. The secondary chuck receives the arbor end of a drilling or cutting tool, such as the arbor end of drill 221 or hole saw 223 shown in dashed lines in FIG. 19. By providing a secondary chuck 219, a drilling or cutting tool, such as drill 221 or hole saw 222, can be inserted into a debris shield without having to remove the debris shield from the hand drill or other drilling machinery, thereby greatly simplifying the use of the debris shield.

To accommodate the secondary chuck 219 and to provide a suitable distance between the secondary chuck and the bottom rim 211 of the debris shield, top cover 205 includes a raised portion 225 formed by side walls 227, which extend upwardly from the cover's bottom skirt portion 229 to a top wall structure 231. The top cover is attached to the bellows portion of the housing by means of retainer ring 233 having channel locking grooves (not shown) spaced around the upper inside perimeter of the ring. The channel locking grooves are provided in enlarged regions 235 of the ring and lockingly engaging corresponding locking tabs 237 distributed around the bottom rim 239 of top cover 205. It can be seen that the inwardly turned top edge 241 of the housing's bellows side wall 207 is dimensioned such that it can be captured between the outer edge portions of the top cover and retainer ring when the retainer ring is locked onto the top cover. Such a locking retaining ring provides for easy assembly and disassembly of the debris shield housing.

Figure 20:
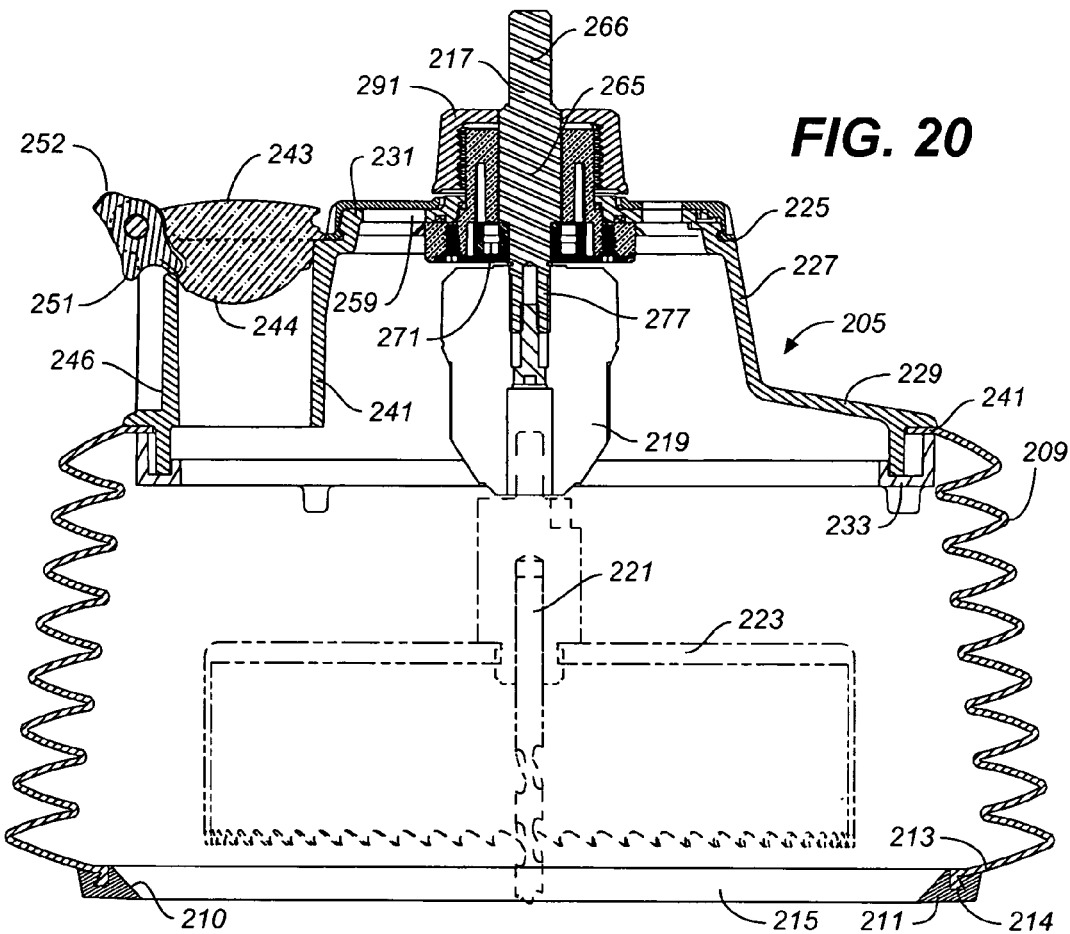
FIG. 20 is a cross-sectional view thereof taken along lines 20-20 in FIG. 18.
Figure 20A:
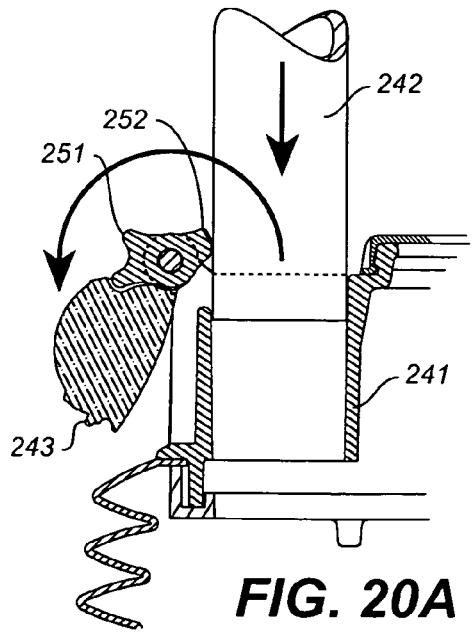
FIG. 20A is a fragmentary view of the debris shield shown in FIG. 20 showing the insertion of a vacuum hose in the vacuum port of the debris shield with the vacuum port cap open.

The housing's top cover in this illustrated embodiment is also seen to include a vacuum port 241 having a hinged closure cap 243. The vacuum port is suitably sized to slidably receive a standard-sized vacuum hose, and provides air communication to the debris collection chamber, whereby debris within the chamber can be sucked out of the chamber through the vacuum hose. The port closure cap 243 is hinged to an enlarged back wall structure 225 formed on one side of the vacuum port. This back wall structure contains a recess 247 which receives locking rib 249 extending across the top of the closure cap when the closure cap is rotated to its full open position, as shown in FIG. 20A. Groove 247 is preferably sized and shaped to allow rib 247 of the closure cap to snap into and out of the groove, so that the closure cap can be securely held in its full open position when a vacuum hose is used. Similarly, the closure cap is suitably designed such that it is retained in a closed position covering the vacuum port when the vacuum port is not in use. This can be achieved by sizing and shaping the cap's bottom portion 244 to press fit into the top of the vacuum port when the cap is rotated to a closed position.

Figure 20B:
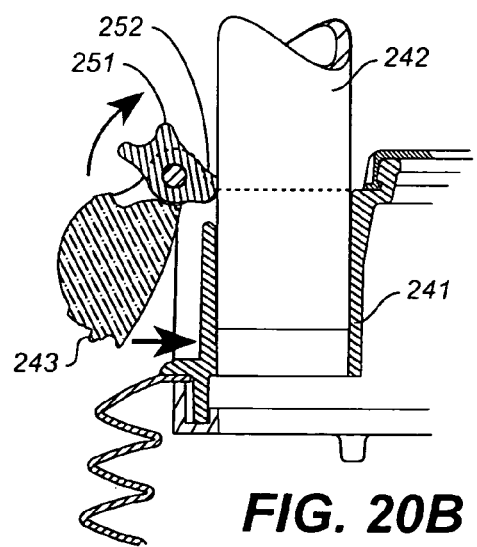
FIG. 20B is a fragmentary view of FIG. 20 showing the cam lock rotated for locking the vacuum hose in the vacuum port.

A cam lock lever 251 is associated with the port closure cap for locking a vacuum hose into place when it is inserted into the vacuum port 241, as illustrated in FIGS. 20A and 20B. The cam lock lever is hinged to the cap's hinge axis 253, and is positioned between the cap's two separated hinge arms 255 so that it can rotate between these hinge arms. As the port closure cap opens, the cam lock lever will rotate with the cap until the cap is fully open and locked into groove 247 on the back wall of the port. Once the cap is open, the cam lock lever can be counter-rotated between the cap's hinge arms until its projecting cam surface 252 engages and locks the vacuum hose 242 in place. A slot 246 is provided at the back of the back wall recess 247 to accommodate the rotation of the cam lock lever.

It can be seen that the top wall structure 231 of the top cover's raised portion 225 provides a mounting structure for the chuck-arbor assembly 217. It also provides vent openings for air circulation within the debris collection chamber 209 when a vacuum hose is coupled to vacuum port 241. The raised top wall structure 231 includes a center opening 259 for receiving the chuck-arbor assembly, and three kidney-shaped vent openings 259 distributed around this center opening. Vent adjustment is achieved by a vent adjustment member in the form of vent cover 261, which has corresponding vent openings 263, and which fits over and rotates on the raised top wall structure of the housing's top cover 205. By rotating vent covers 261 on the raised top wall structure, the vent openings in both the cover and top wall structure can be aligned or unaligned as desired. Alignment of the vent openings will permit air to be drawn into the debris collection chamber of the debris collection housing as debris is vacuumed out through the vacuum port. The vent cover is suitably provided with a knurled rim 265 for easy gripping, and detents (not shown) for marking rotational position.

Figure 21:
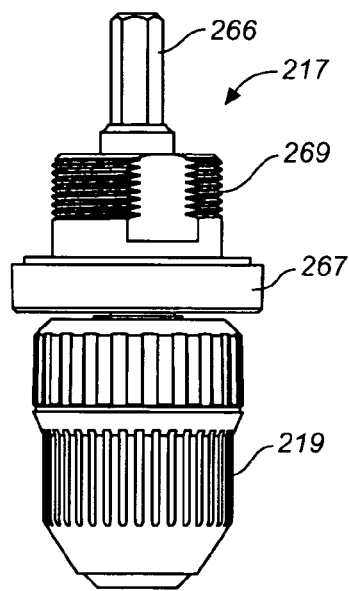
FIG. 21 is a side elevational view of the chuck-arbor assembly of the debris shield shown in FIGS. 18-20.
Figure 21A:
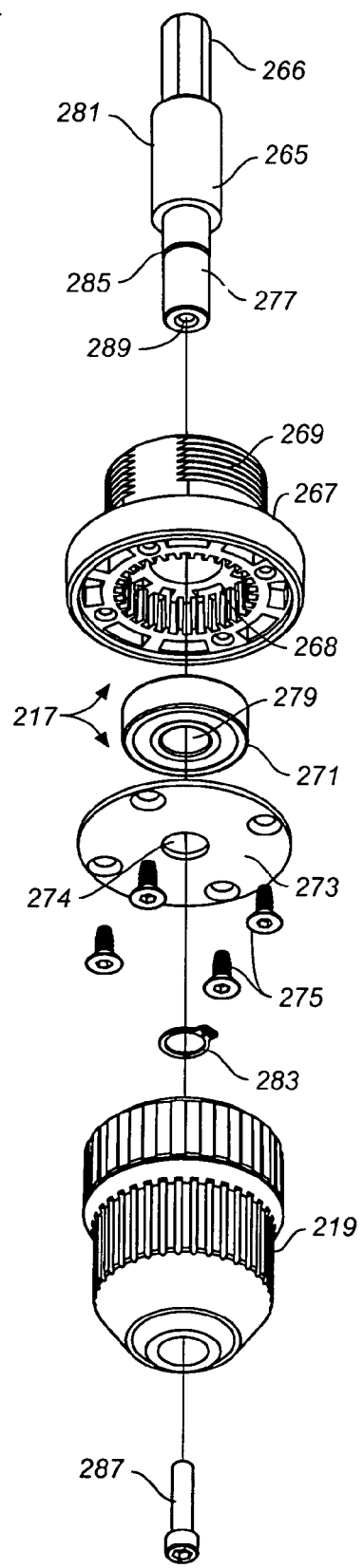
FIG. 21A is an exploded bottom perspective view thereof.

The chuck-arbor assembly 217 for this embodiment of the invention is best illustrated in FIGS. 21 and 21A. The chuck-arbor assembly is comprised of secondary chuck 219, chuck shank 265 having arbor end 266, a bearing support element 267 having a threaded nipple end 269, bearing 271, and bearing cover plate 273. When assembled, the chuck shank is supported by bearing 271 such that it, along with secondary chuck 219, can rotate within the bearing support element 267. To assemble the chuck-arbor assembly, bearing 271 is inserted into the bearing supports bottom opening 268, which is sized to receive the bearing, and which has a serrated inner surface to facilitate insertion of the bearing. Bearing cover 273 is then placed on the bottom of the bearing support element over the bearing 271, and attached by screws 275. The narrow diameter end 277 of chuck shank 265 is sized to fit and slide through the inner bearing race 279 until the chuck shank's enlarged center 281 butts against the bearing. The chuck shank is retained on the bearing by retainer ring 283, which slips into groove 285 on the narrow end of the chuck shank. The narrow end of the chuck shank projects through the center hole 274 of bearing cover plate 273, and the secondary chuck 219 is held onto this end of the shank by means of allen-head screw 287, which screws into a tapped hole 289 in the end of the shank.

The assembled chuck-arbor assembly 217 is secured to the top wall structure 231 of top cover 235 by first inserting the threaded nipple end of the bearing sleeve 267 through the top wall structure's center opening 257. The bearing sleeve is then secured in place by screwing cap nut 291 onto the sleeve's nipple end, which protrudes up through the center opening 264 of vent cover 261. Cap nut 291 has a top opening 293 through which the chuck-arbor assembly's arbor end 266 can protrude. The arbor end of the chuck-arbor assembly should protrude through the cap nut a sufficient distance to allow the chuck of a hand drill, drill press, or the like to clamp onto the protruding arbor. Once secured in place, the secondary chuck, which is most suitably a keyless chuck, is ready to receive and secure a drilling or cutting tool, such as the drill bit 221 or hole saw 223, illustrated in FIG. 20. The assembled debris shield with its chuck-arbor assembly can then be used with any rotating drilling or cutting tool or machine having a chuck for gripping an arbor. The primary chuck of the drilling or cutting tool or machine will rotate the secondary chuck in the debris shield housing to, in turn, rotate the drilling or cutting implement held by the secondary chuck, as it advances into the work surface against which the debris shield is placed. Bellows side walls 207 permit movement of the drilling or cutting tool along a compression axis (denoted by the letter A in FIG. 20) as pressure is placed on the top of the debris shield. If a vacuum hose is attached to the vacuum port 241 as this drilling or cutting action occurs, debris generated by the drilling and cutting action will be sucked out of the debris shield, and, more specifically, its debris collection chamber 209. It is noted that, as in earlier-described embodiments of the invention, the relatively large kidney-shaped openings in the vent openings in the top cover of this embodiment of the debris shield can be used as plug knock-out holes for dislodging the plugs produced by hole saws.

Figure 22:
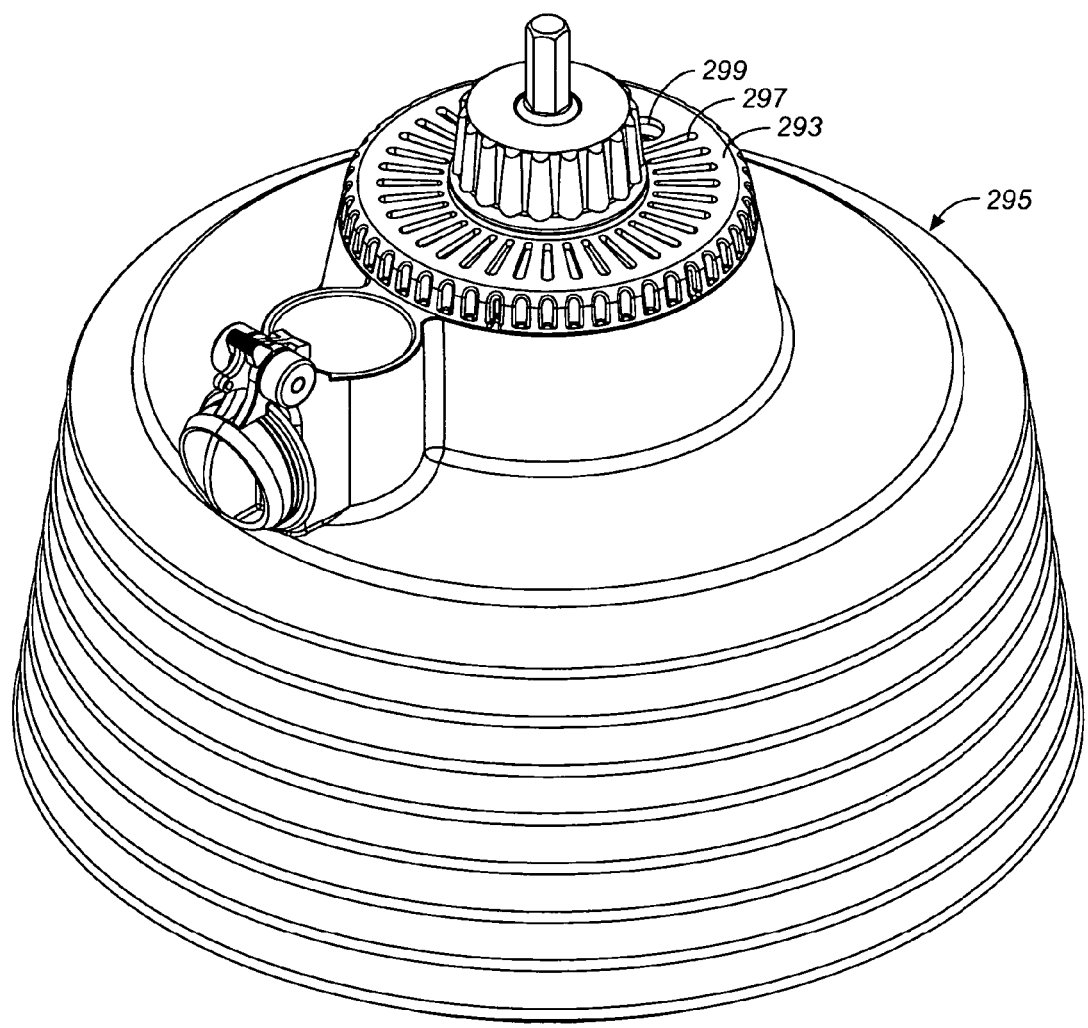
FIG. 22 is a top perspective view of a version of the debris shield shown in FIGS. 18-20, with a different vent opening configuration.
Figure 23:
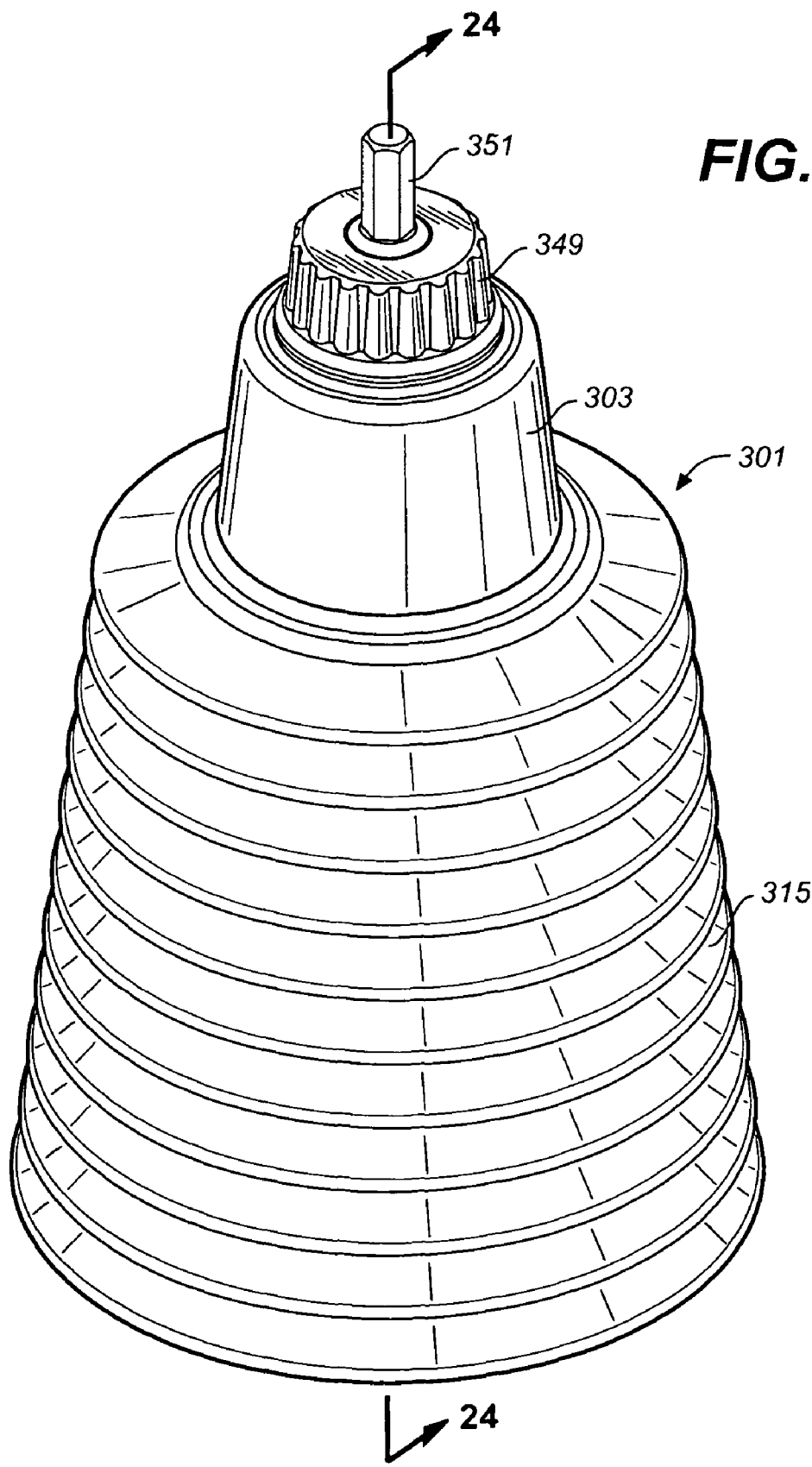
FIG. 23 is a top perspective view of an another embodiment of a debris shield in accordance with the invention wherein the debris shield has no vacuum port or vent openings, and wherein the bellows-shaped debris-collection housing is provided with added length to accommodate a long spade bit.
Figure 24:
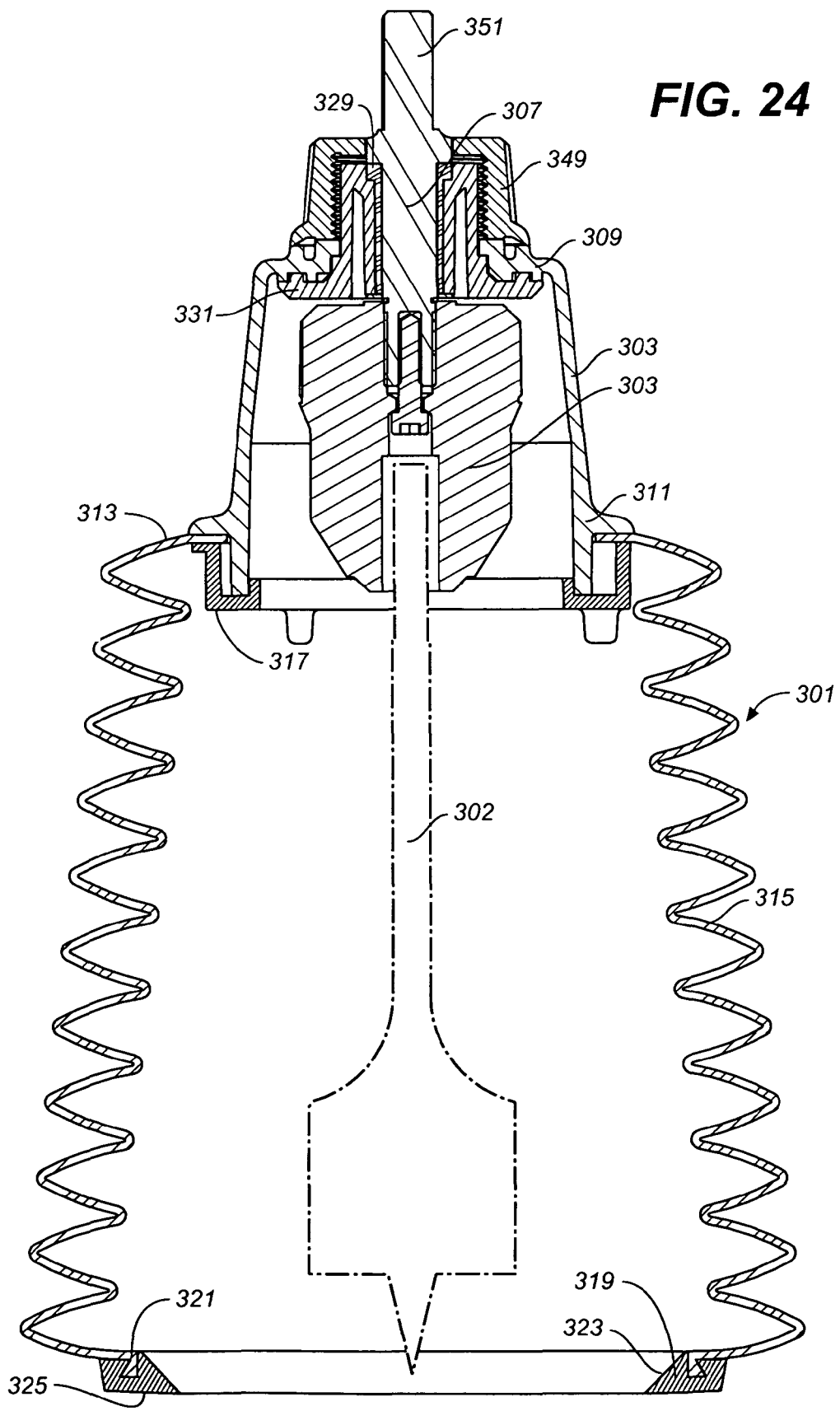
FIG. 24 is a cross-sectional view thereof in side elevation showing the chuck-arbor assembly mounted at the top of the debris collection housing.

FIG. 22 shows a variation of the debris shield illustrated in FIGS. 18-21. In this case, vent cover 293 of debris shield 295 has vent openings in the form of narrow radial slots 297 instead of the kidney-shaped openings. Corresponding radial slots (not shown) are provided in the top wall structure of the raised portion of the top cover, so that the vent cover slots and the slots of the top wall structure can be moved into and out of alignment by rotating the vent cover. An additional knock-out hole 299 is provided in an area of the top cover where there are no radial vents to allow a rod-shaped implement to be inserted through the hole to knock out plugs produced by a hole saw. Other adjustable venting schemes are possible and considered within the scope of the invention, including using vent adjustment members that are not rotatable, however, use of rotatable vent adjustment members are considered superior to other possible venting schemes.

FIGS. 23-27 illustrate a taller version of the debris shield, suitable for use with a spade bit. In this version, debris shield 301 has a cylindrically-shaped, upright top cover 303 sized to house a secondary chuck 305 of a chuck-arbor assembly 307. This top cover has a top wall structure 309 for supporting the chuck-arbor assembly, and a bottom rim 311, to which the top edge 313 of bellows side walls 315 is attached by means of retaining ring 317. The bellows side walls are seen to depend downwardly from the top cover to surface contact rim 319, which is fabricated of a resilient material, and which is fitted onto the downwardly projecting bottom edge 321 of the side walls. It is noted that, like the previous embodiment, the inner rim wall 323 of contact surface rim 319 angles inwardly from the rim's bottom contact surface 325. This inwardly-angled wall provides a "dust pan" effect for improving sealing contact between the contact rim and the work surface, and for minimizing leakage of debris from the dust shield.

Figure 25:
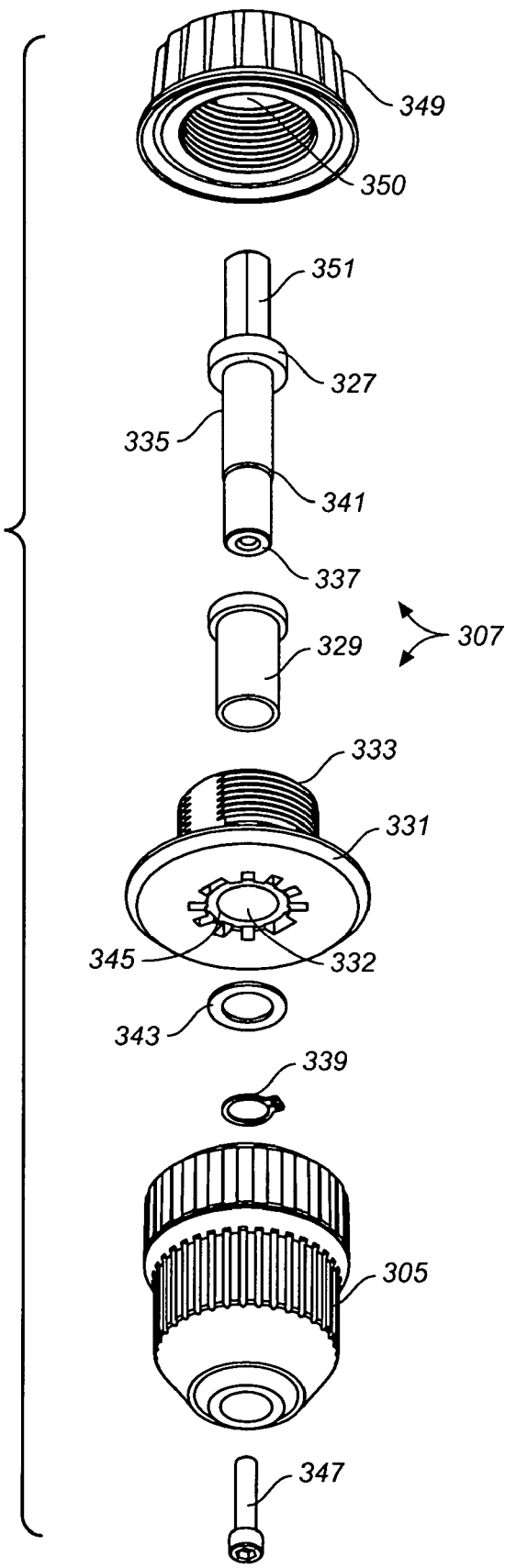
FIG. 25 is an exploded view of the chuck-arbor assembly shown in FIG. 24.
Figure 26:
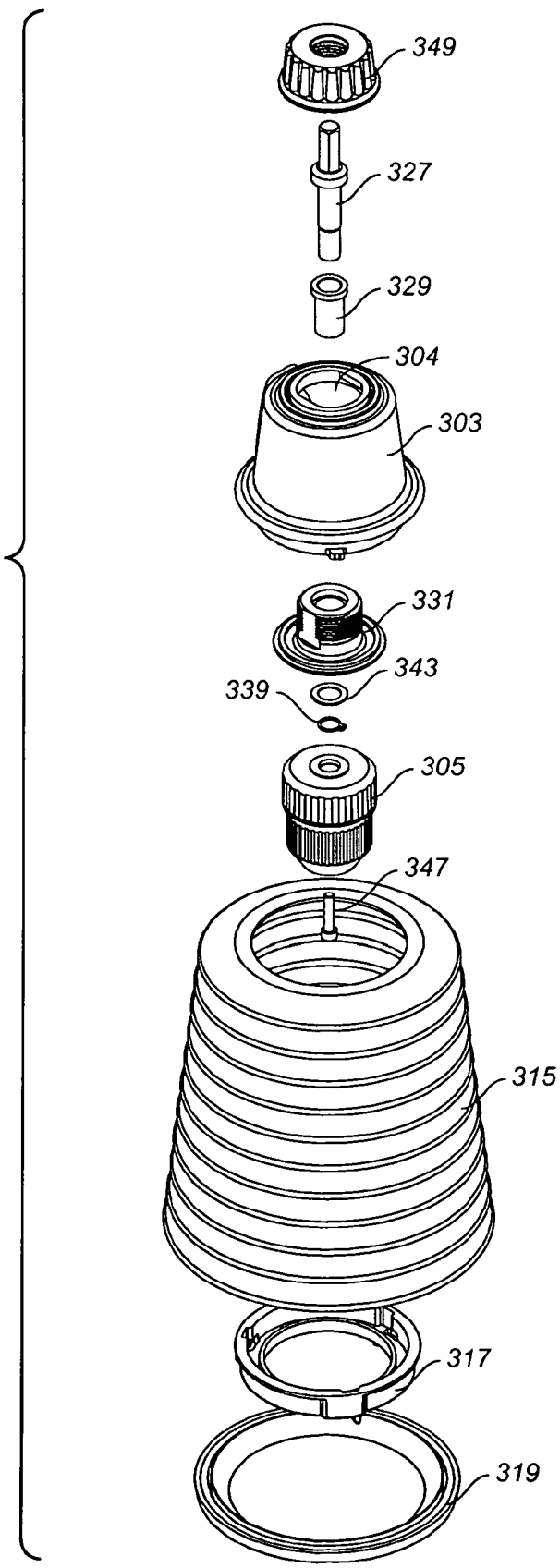
FIG. 26 is an exploded top perspective view of the entire debris shield shown in FIGS. 23 and 24.
Figure 27:
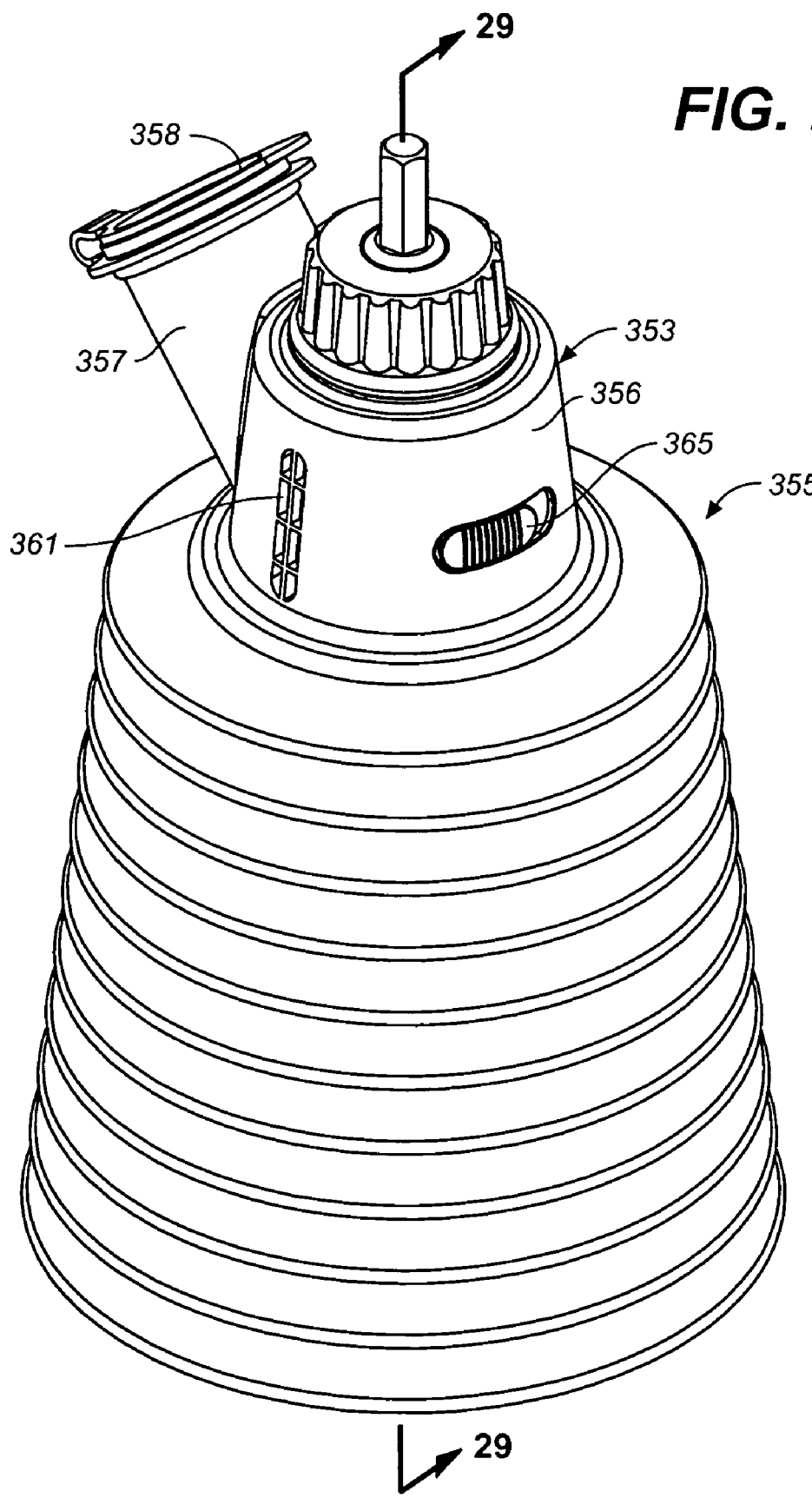
FIG. 27 is a top perspective view of an embodiment of the invention shown in FIGS. 23 and 24 with the addition of a vacuum port and vent openings.
Figure 28:
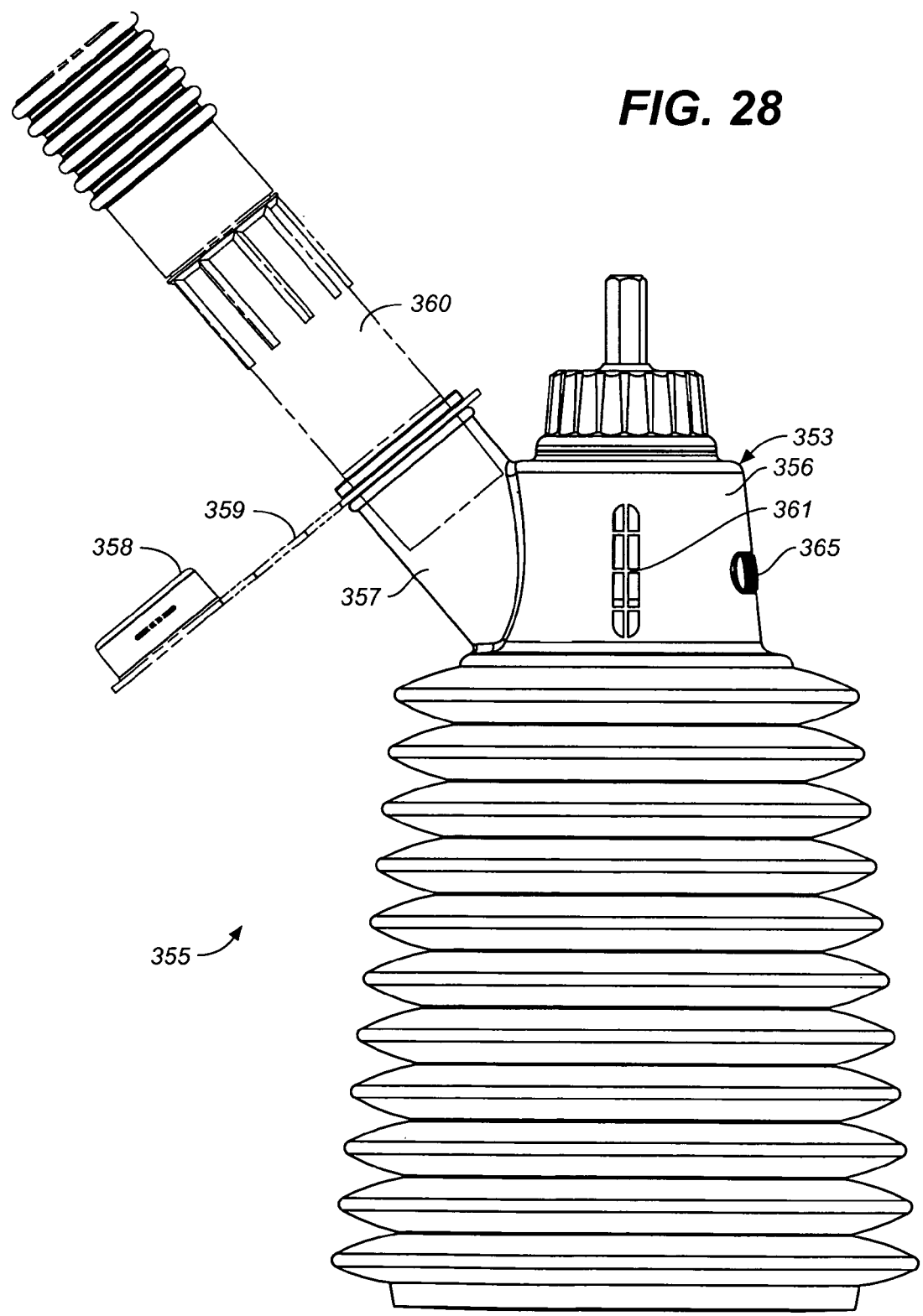
FIG. 28 is a side elevational view thereof.
Figure 29:
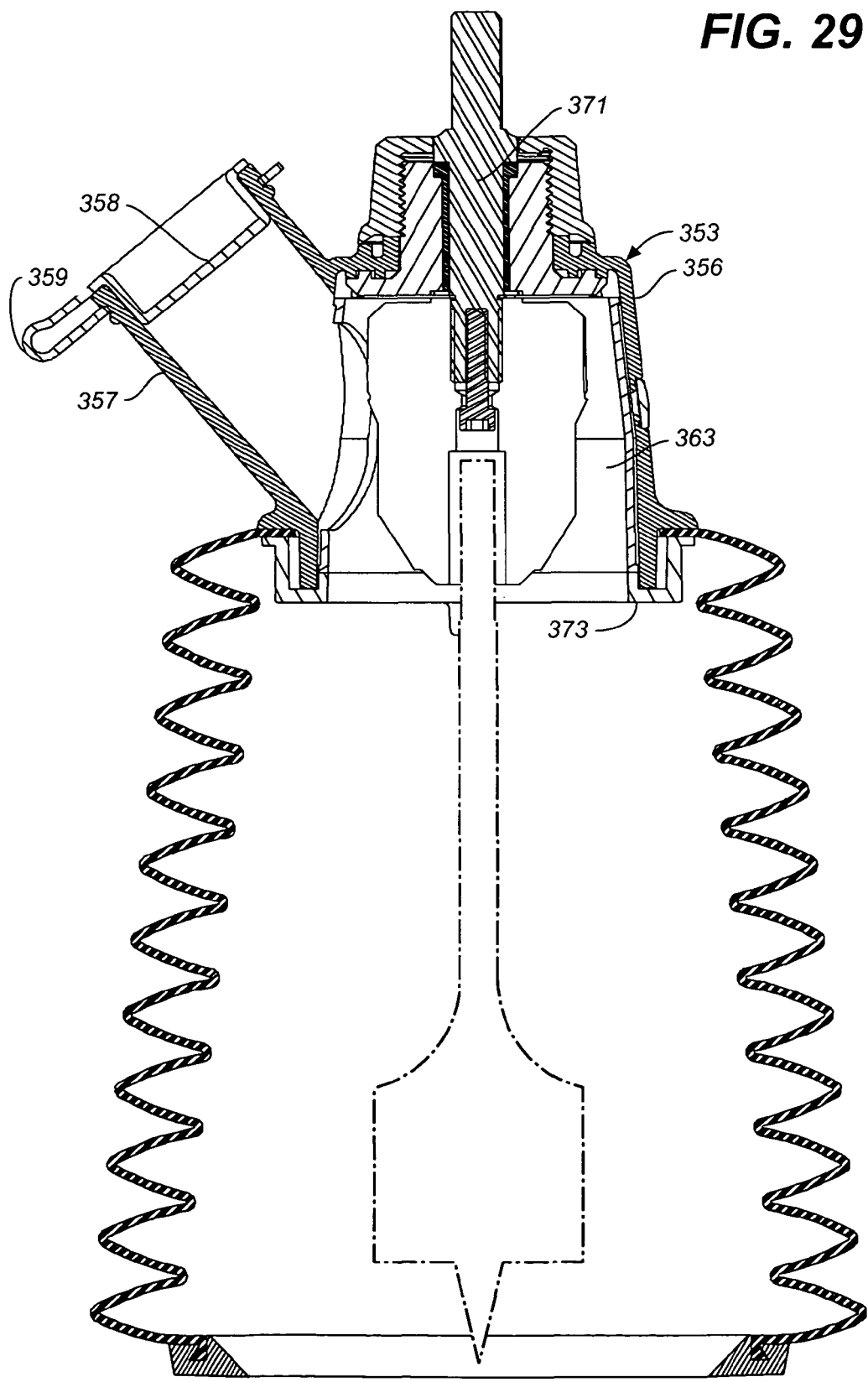
FIG. 29 is a cross-sectional view thereof taken along line 29-29 in FIG. 27.
Figure 30:
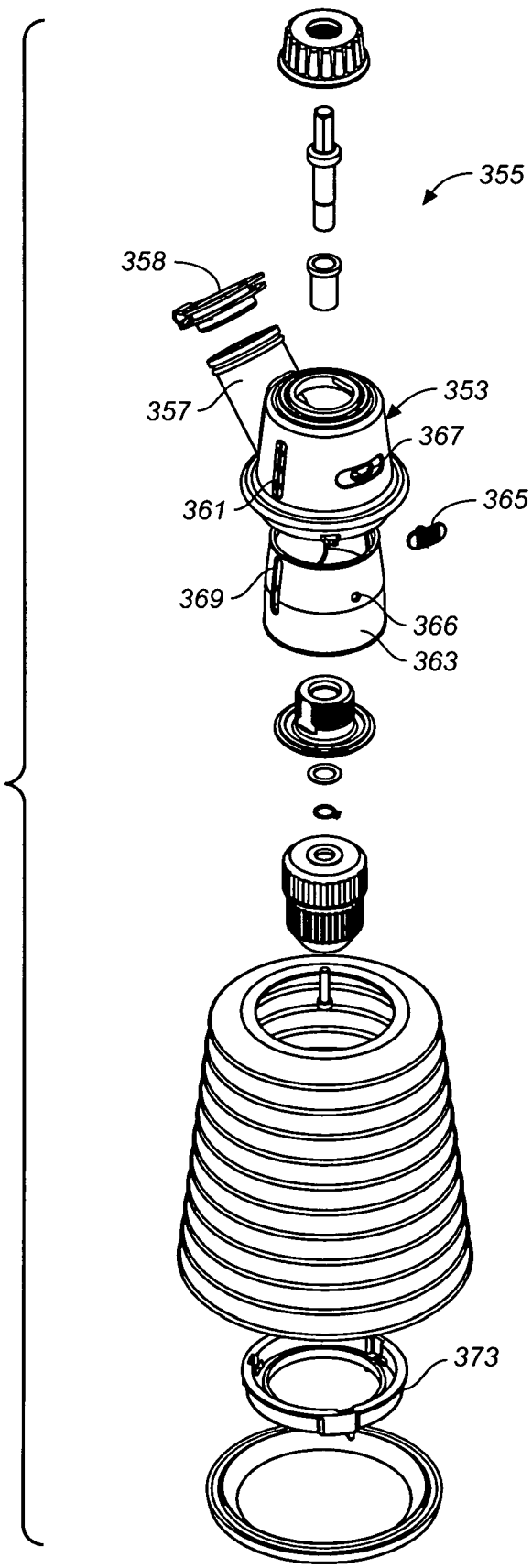
FIG. 30 is an exploded top perspective view thereof.

The chuck-arbor assembly of this embodiment of the invention is substantially the same as the chuck-arbor assembly of the previously described embodiment, except for the type of bearing used in the assembly. As best shown in FIG. 25, the chuck-arbor assembly 307 includes chuck shank 327, sleeve bearing 329 (suitably fabricated of bronze), a flanged bearing support element 331 having a threaded nipple end 333 and center bore 334, and secondary chuck 305. In this case, the bearing shaft end 335 of chuck shank 327 is inserted through sleeve bearing 329, which is, in turn, inserted into the center bore 334 of the bearing support member 331. The chuck shank is held in place in the sleeve bearing and bearing support member by means of retainer ring 339, which can be snapped into retainer ring groove 341 of the end 337 of the chuck shank that projects from the bearing support member. Suitably, a washer 343 is provided behind the retainer ring in the washer recess 345 on the bearing support member's flanged end. The secondary chuck 305 is attached to the end 337 of the chuck shank by hex screw 347.

The chuck-arbor assembly of this embodiment is secured to the top wall structure 309 of top cover 303 by means of cap nut 349. This is accomplished by simply inserting the arbor end 351 of the chuck-arbor assembly through the top opening 304 of the top cover until the flanged end 332 of the bearing support member contacts the top cover's upper wall structure 309. Cap nut 349, which has a top opening 350, is then simply screwed down onto the threaded nipple of the bearing support member that projects above the top cover.

It is noted that the embodiment of the dust shield of the invention illustrated in FIG. 23-26 does not provide for a vacuum port for vacuuming debris from the dust shield's debris collection chamber. FIGS. 27-30 show a modified version of the dust shield in FIGS. 23-26, wherein a vacuum port has been added. In this embodiment, the top cover 353 of debris shield 355 has a upright cylinder wall 356 and a vacuum port 357 formed in the cylinder wall. The vacuum port is formed to have an upward extension to facilitate the insertion of a vacuum hose, such as the vacuum hose shown in FIG. 29. When the vacuum port is not in use, vent port 357 is closed by a port closure cap 358 tethered to the vent port by a flexible strip, suitably a plastic strip, 359.

The of this embodiment further includes opposed vent openings 361 in the top cover's cylinder wall 356, which are located about ninety degrees to either side of the vacuum port. These vent openings can be opened and closed by rotating a vent adjustment member in the form of inner vent sleeve 363 (see FIG. 30) within the top cover. The vent sleeve is rotated by using a finger or thumb to move tab 365, which is located on the outside of the cover, and which is connected to the inner sleeve through an elongated opening 367. The length of elongated opening 367 can be chosen to set the limits of the movement of tab 365. As this tab is moved, the sleeve is rotated to bring its vent slot 369 into and out of registration with the vent ports 361 on the cylinder wall of the top cover.

The chuck-arbor assembly 371 of this embodiment is identical to the chuck-arbor assembly of the previously-described embodiment. The chuck-arbor assembly is secured to the top cover in essentially the same manner as previously described, except that the chuck-arbor assembly will now be placed within the rotatable vent sleeve 363, which is contained within the by retainer ring 373.

Figure 31:
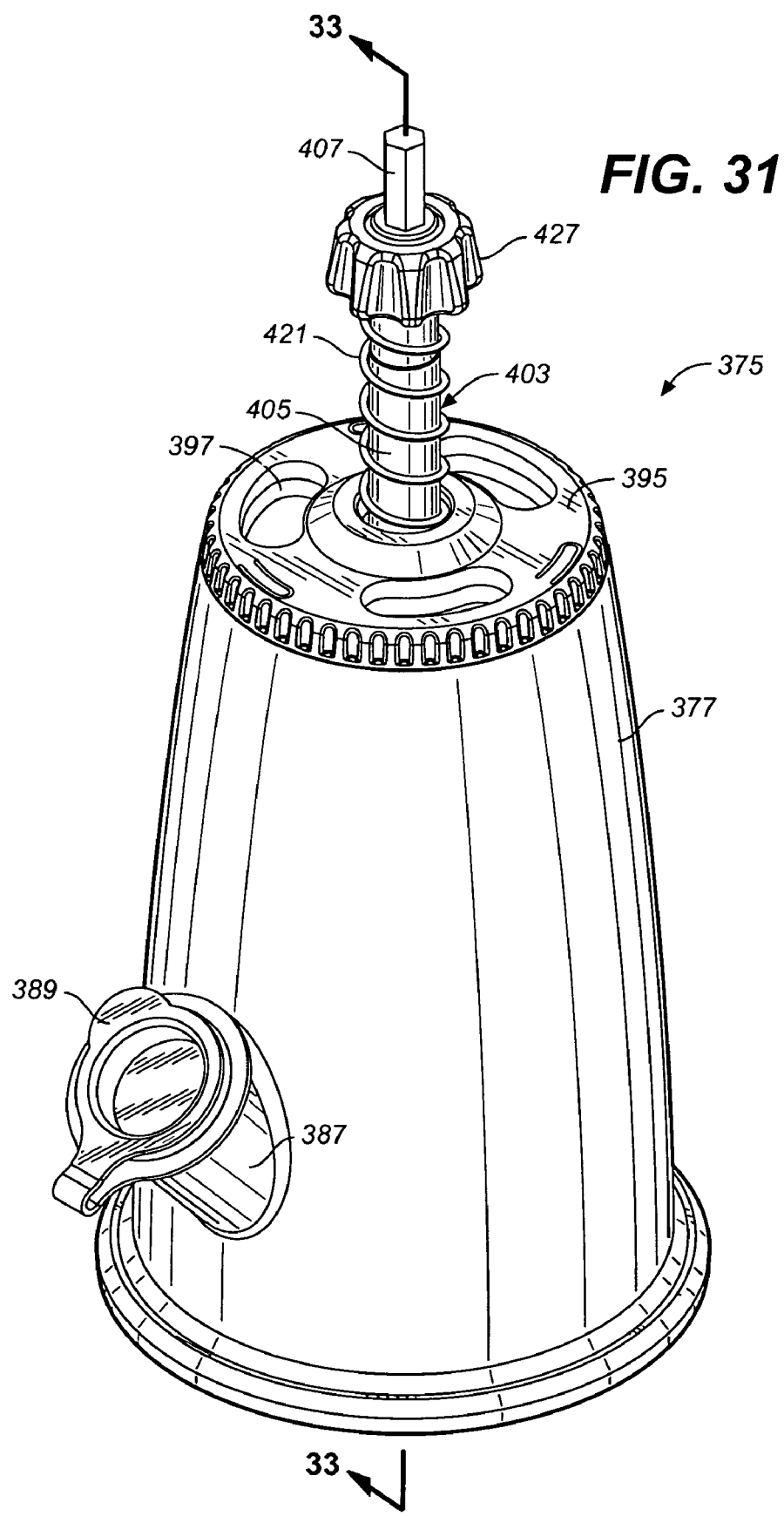
FIG. 31 is a top perspective of yet another embodiment of the debris shield of the invention, wherein compression is provided by means of a spring-loaded chuck shank rather than by a bellows housing.
Figure 32:
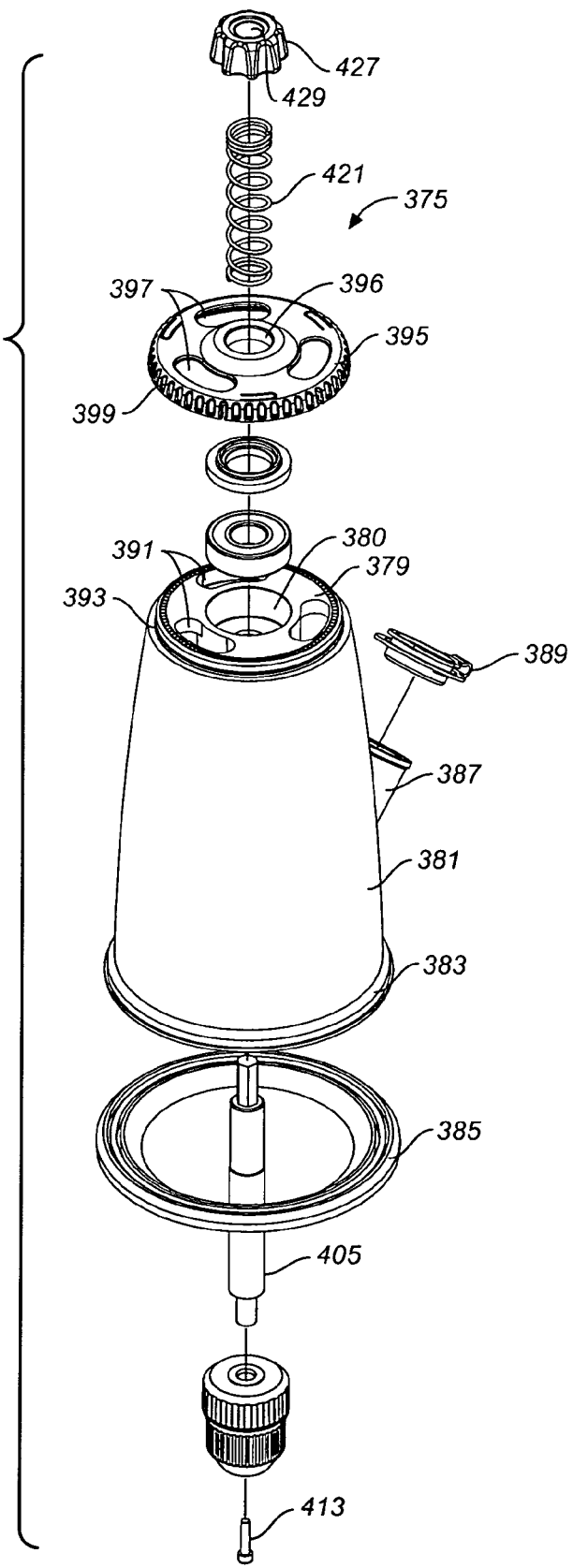
FIG. 32 is an exploded top perspective view thereof.
Figure 33:
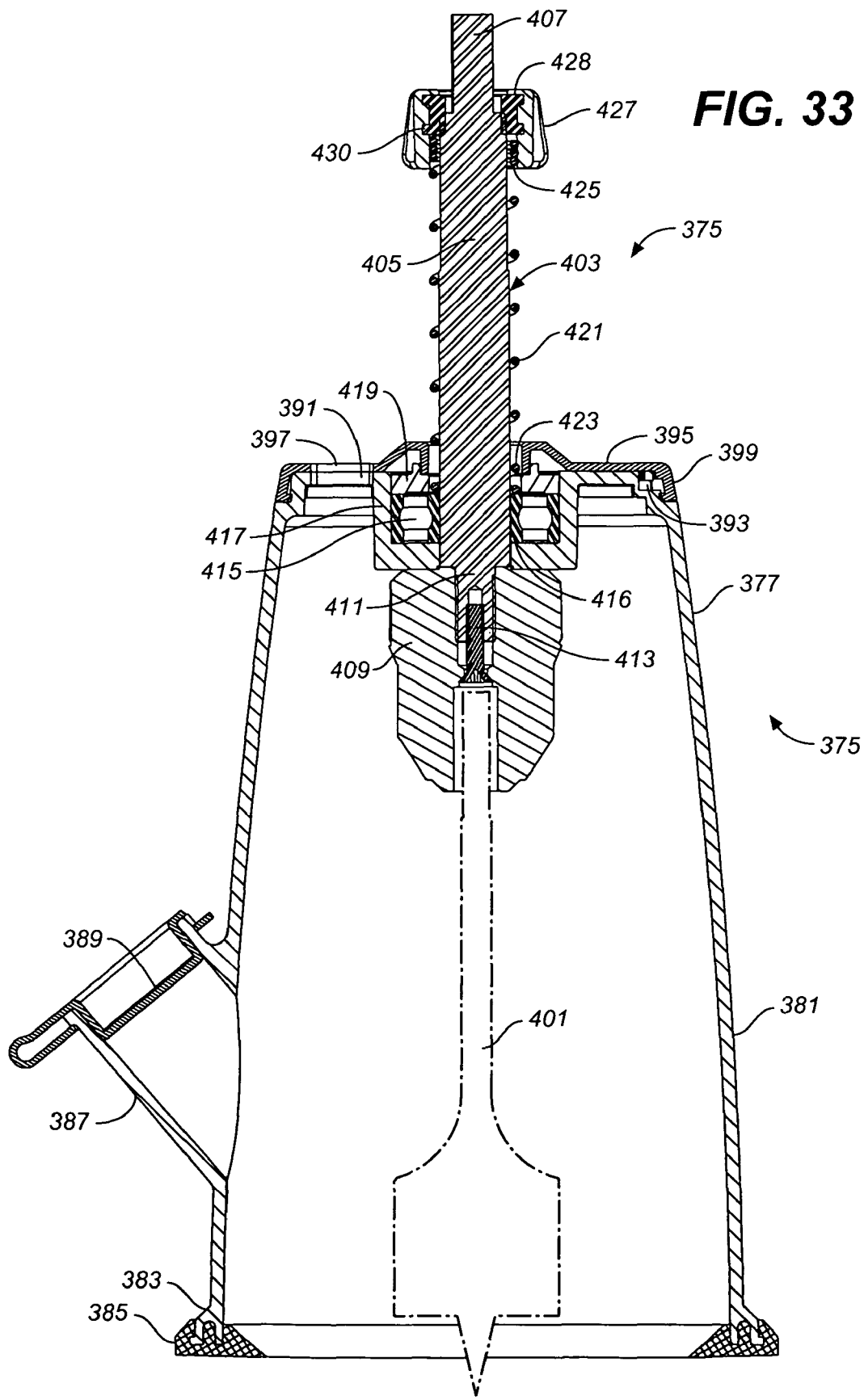
FIG. 33 is a cross-sectional view thereof taken along line 33-33 in FIG. 31.

FIGS. 31-33 show yet a further embodiment of the invention, wherein debris shield 375 has a rigid, non-compressible debris collection housing 377, and wherein compression along the axis of the debris shield is provided by a depressible spring-loaded chuck shank as later described. The debris collection housing of this embodiment includes a top wall structure 379, rigid side walls 381, and a bottom edge 383, onto which is fitted a resilient surface contact rim 385. A vacuum port 387, having a port closure cap 389, is provided on the rigid side walls of the housing, preferably near the housing's bottom edge 383 so as to provide suction near the work surface where the debris is being generated. The housing's top wall structure includes three kidney-shaped vent openings 391 (which can also act as knock-out holes), and an outer shoulder 393, over which vent cover 395, having corresponding kidney-shaped vent openings 397, can be placed, and on which the vent cover can rotate. By rotating the vent cover on top wall structure 379, the vent cover's vent openings 397 can be brought into and out of registration with the vent openings 391 of the top wall structure. The vent cover is suitably fabricated of a polycarbonate plastic material, and its downwardly extending, knurled rim 399 can be flexed slightly to snap over the shoulder of the top wall structure of the debris collection housing. The vent cover is retained on the top wall structure by providing a small bead around the inside of the knurled rim that can snap into a corresponding groove on shoulder 393.

As in the previously-described bellows versions of the invention, the rigid debris collection housing 377 of the embodiment shown in FIGS. 31-33 is preferably fabricated of a clear plastic material so that the housing is transparent, and so that the user can see spade bit 401 during the drilling operation. A suitable material for the rigid housing would be a lightweight, clear polycarbonate plastic.

The spade bit 401 is held in debris collection housing 377 by a chuck-arbor assembly 403, comprised of elongated chuck shank 405 having arbor end 407 and secondary chuck 409, which again is preferably a keyless chuck. Secondary chuck 409 is attached to the chuck shank's base end 411 by suitable attachment means, such as phillips screw 413, and the assembly is mounted in top wall structure 379 by means of ball bearing 415, which is set into a bearing recess cavity 417 in the top wall structure of the debris collection housing. A bearing retainer 419 fits into the top of the bearing recess cavity over the ball bearing to hold the bearing in the cavity. This retainer can suitably be held in place by a clear adhesive.

In this embodiment of the invention, rather than using a bellows housing to provide for compression along the compression axis of the housing, the chuck-arbor assembly 403 slides within the housing's top wall structure and is provided with a spring-loaded chuck shank 405 to allow the chuck-arbor assembly to be depressed against a restoring force along the compression axis. To produce a restoring force, a compression spring 421 is provided on the portion of the chuck shank projecting above the debris collection housing's top wall structure and vent cover. This compression spring has a bottom end 423, which engages and presses against the top of the inner race 416 of ball bearing 415, and a suitably closely coiled top end onto which spring locking cap 427 can be secured. Locking cap 427 has a center opening 429 so that the cap can be placed over the chuck shank's arbor end 407, and is suitably fabricated of a plastic material with an internally threaded metal insert 428 to allow the cap to screw down onto a threaded barrel portion 430 of the chuck shank.

Assembly of the chuck-arbor assembly and debris collection chamber of this embodiment is accomplished relatively easily. Once the bearing 415 has been installed in bearing recess cavity 417 and the vent cover 395 has been snapped onto the housing's top wall structure, and after the secondary chuck 409 has been attached to the chuck shank by screw 413, the arbor end of the chuck shank can be inserted through the center openings 380 and 396 of the housing's top wall structure and vent cover. The compression spring 421 can then be slipped onto the portion of the shaft projecting above the vent cover. Locking cap 427 is then slipped over the arbor end of the shaft and rotated tightly onto the top end 425 of the spring. Suitably, the inside dimension of the cap can be sized to provide a force fit over the tightly coiled end of the spring so that the cap is locked in place. The debris shield can be preassembled by the manufacturer, or it can be shipped in parts for assembly by the user.

FIGS. 33A and 33B illustrate the operation of the debris shield shown in FIGS. 31 and 32, and how compression along the compression axis A of the debris collection housing is achieved to allow the spade bit 401 to advance while cutting a hole in work surface 431. First, it is noted that the length of the debris collection housing is preferably chosen so that the pilot tip 402 of a standard sized spade bit 401, when fully retracted as shown in FIG. 33A, projects just beyond the surface contact rim 385 of debris collection housing 377. With the arbor end of the debris shield's chuck-arbor assembly secured by the primary chuck 433 of a hand drill or other drilling machine, for example, a drill press, and with the spade bit 401 secured in the secondary chuck 409 of the shield's chuck-arbor assembly 403, the debris shield is placed against the work surface such that the spade bit's pilot tip penetrates the selected drilling location, which suitably is marked. By using a preferred transparent material for the housing, the user will be able to see the spade bit through the shield's housing and to visually guide the spade bit to the marked drill location. Once in place, the hand drill or other drilling machine is activated, and a force, represented by force arrow F in FIG. 33B, is applied in the direction of the compression axis A to advance the chuck-arbor assembly and spade bit along the compression axis so that the cutting end of the spade bit cuts into the work surface to create the desired hole 432 in the surface. Debris generated by this cutting action (graphically represented by chips 435 in FIG. 33B) are captured by the debris collection housing and vacuumed out through vacuum port 387 and vacuum hose 390. After the hole is cut, the force is removed from the chuck-arbor assembly, whereupon the compression spring 421 causes the spade bit to return to its original retracted position.

It is noted that during the cutting operation above described, the vent cover 395 should be rotated so that the vent openings in the cover and top wall structure of the housing are in registration, or at least partial registration, to allow air to circulate through the debris collection housing. The vent cover can be adjusted to obtain an optimal vacuuming action. If the debris shield is used without a vacuum connected to the vacuum port, the vacuum port would be capped with cap 389 and the vent cover rotated to close the vent opening.

It is further noted that in this tall version of the debris shield, the spade bit (or other cutting or drilling implement) can easily be installed and removed by unscrewing cap 427 from chuck shank 405 and removing the cap and attached compression spring 421 from the chuck shank. The chuck shank and attached secondary chuck can then be dropped out through the bottom of the debris collection housing, and a spade bit clamped into the secondary chuck. The chuck shank and secondary chuck can then be reinserted into the housing and the cap and spring can be replaced over the arbor end of the chuck shank. The cap can then be screwed down onto the threaded barrel portion of the shank.

Figure 34:
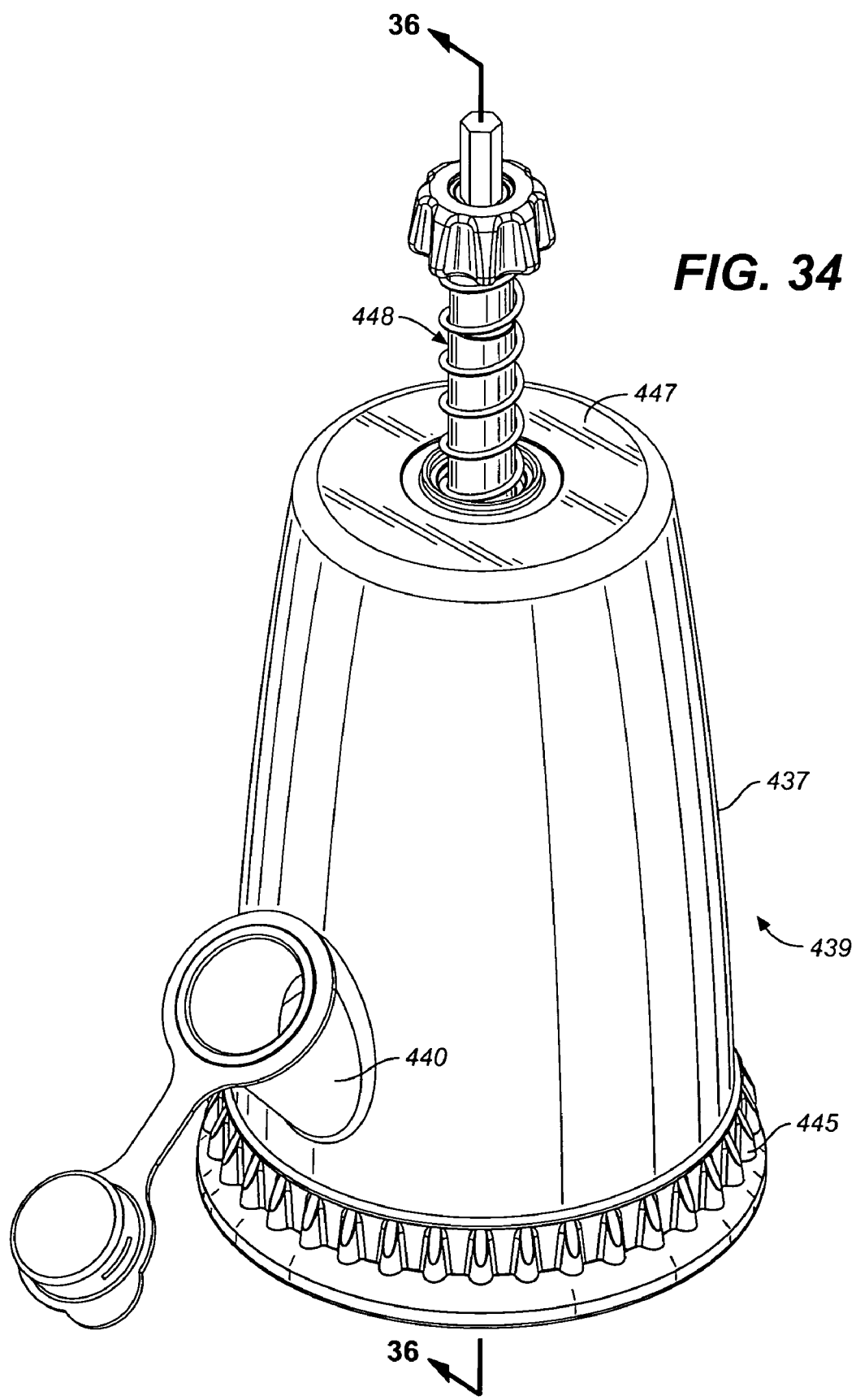
FIG. 34 is a top perspective view of a variation of the debris shield shown in FIGS. 31-33, wherein vent holes are added to the bottom of the debris collection housing.
Figure 35:
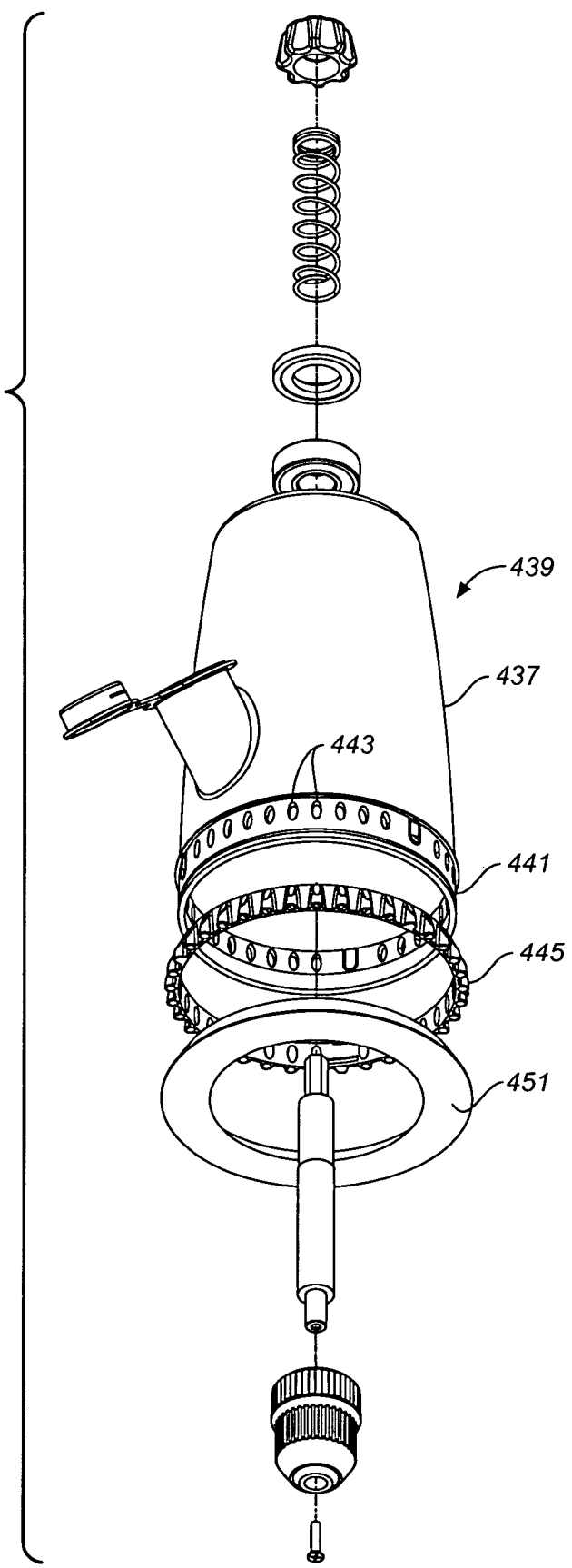
FIG. 35 is an exploded bottom perspective view thereof.
Figure 36:
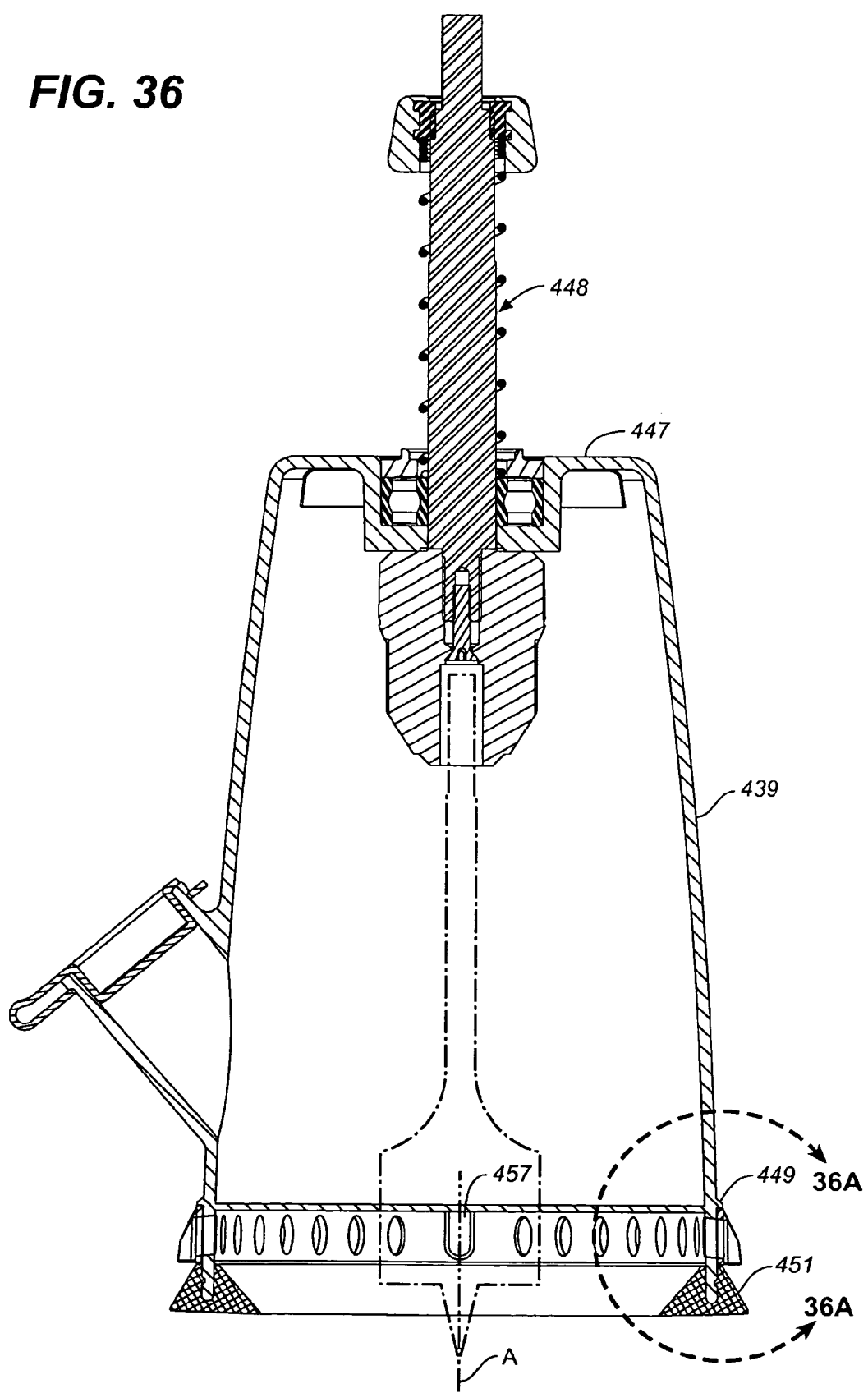
FIG. 36 is a cross-sectional view thereof in side elevation.
Figure 36A:
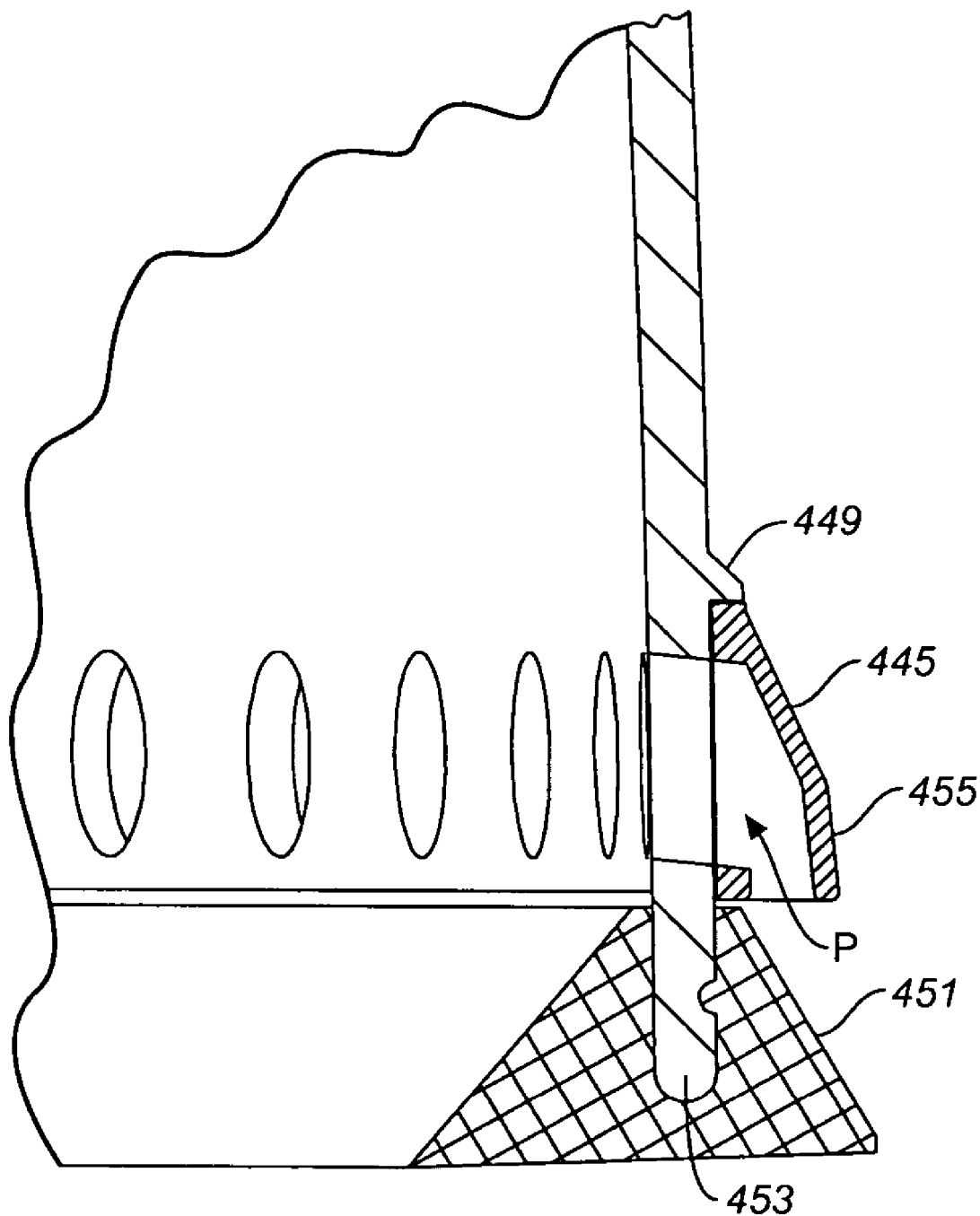
FIG. 36A is a fragmentary view thereof within line 36A-36A in FIG. 36, showing the detail of the vent openings at the bottom of the debris collection housing.

FIGS. 34-36 illustrate a variation of the debris shield shown in FIGS. 31-33, wherein venting of the rigid debris collection housing 437 of debris shield 439 having vacuum port 440 occurs near the bottom of the housing through distributed vent openings 443 in the housing's bottom perimeter wall 441, rather than through the housing's top wall structure 447. Vent ring 445 is placed over the housing's bottom perimeter wall 441 to provide air flow adjustment. The vent ring is slipped beneath an outwardly-projecting housing ring retaining ridge 449, and is held in place-against this ridge by surface contact rim 451, which is fitted over the housing's bottom edge 453. The vent ring has distributed vent openings, which correspond to the vent openings around the housing's bottom perimeter wall, and which register with the housing's vent openings upon proper rotation of the vent ring. As best illustrated in FIG. 36A, the vent openings of the vent ring have an outer shroud 455 for creating an indirect air circulation path (represented by air flow arrow P) through the vent ring. Such shrouded vents can be used to prevent any possible risk of small particles being ejected through vent openings in the direction of the user of the debris shield. Indexing means, such as a detent spring tab 457 and corresponding detents (not shown), can be provided on the vent ring and housing to index positions of the vent ring corresponding to vents open and vents closed positions. Except as discussed above, debris shield 441 is identical in its construction, assembly, and use to debris shield 375, illustrated in FIGS. 31-33. This includes the use of a spring loaded chuck-arbor assembly 448 to allow for travel of the spade bit along the debris shield's compression axis A.

Figure 37:
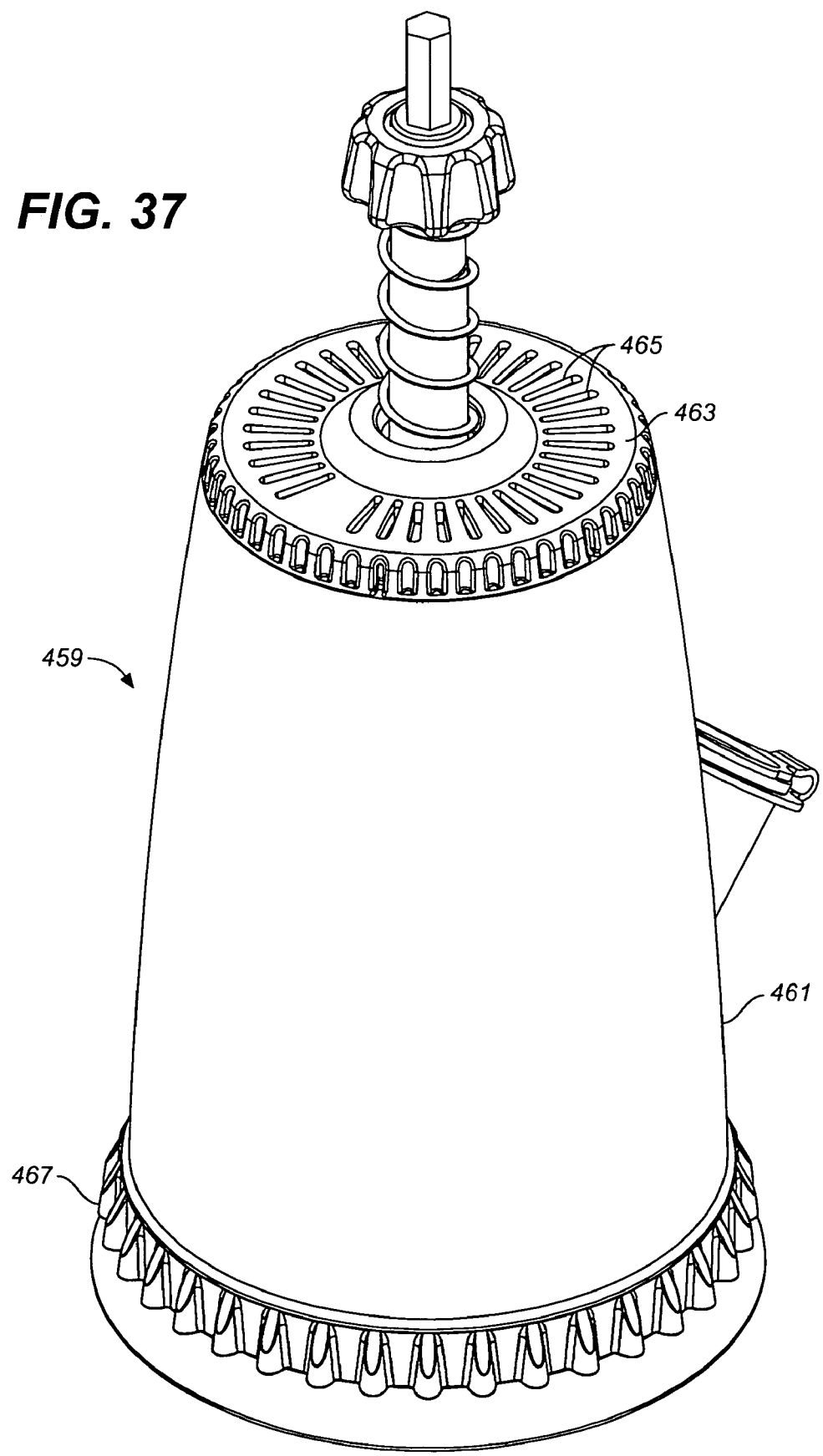
FIG. 37 is a top perspective view of a variation of the debris shield shown in FIGS. 34-36, wherein vent openings are added to the top of the debris collection housing.

FIG. 37 illustrates a further possible variation of the debris shield shown in FIGS. 31-33. In this case, debris shield 459 has a vacuum ported debris collection housing 461, which is adjustably vented at both the top and bottom of the housing. At its top, the housing is provided with an adjustable vent cover 463 similar to the vent cover 395 in the earlier-described embodiment, except for the number, size, and shape of the vent openings. In this embodiment, vent openings 465 in the vent cover consist of radial slots corresponding to similar vent openings in the top wall structure of the housing (not shown), as opposed to kidney-shaped openings. At its bottom, the housing is provided with an adjustable vent ring 467S which covers vent openings (not shown) in a bottom perimeter wall of the housing. This lower vent ring is identical to the vent ring construction described in connection with the embodiment of FIGS. 34-36.

Figure 38:
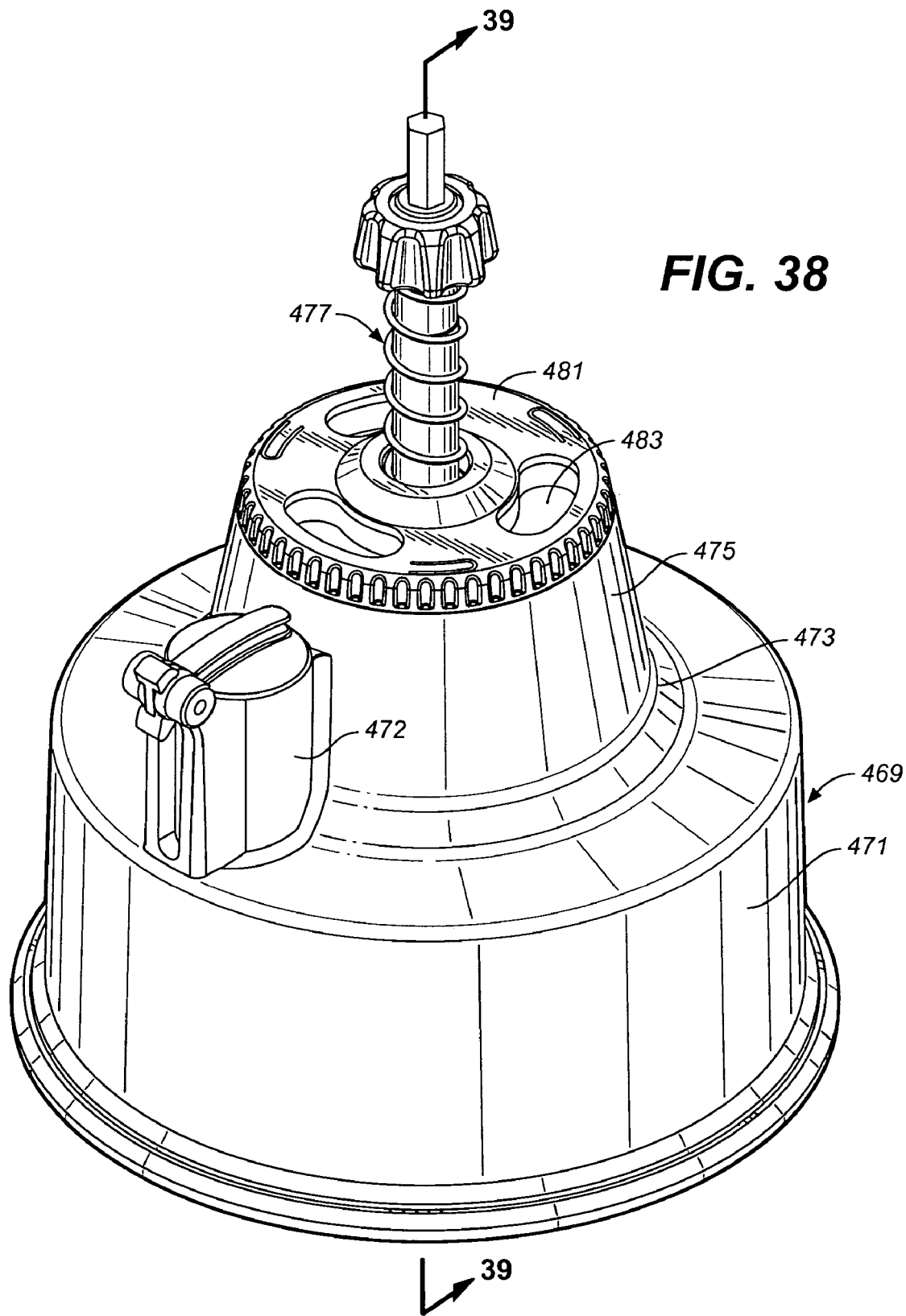
FIG. 38 is a top perspective view of still a further embodiment of the debris shield of the invention, wherein compression is provided by means of a spring-loaded chuck shank in a short debris shield having a rigid debris collection housing.

FIGS. 38 and 39 illustrate a short, non-bellows version of the debris shield of the invention suitable for use with a hole saw. In this embodiment, debris shield 469 has a relatively short rigid debris collection housing 471, again suitably fabricated of a clear polycarbonate plastic, and includes a vacuum port 472. The housing's top structure 473 is similar to the top cover 225 of the bellows version of the short hole saw debris shield shown in FIGS. 18-21: it has a raised portion 475, which, as best shown in FIG. 39, has a top wall structure 476 into which the chuck-arbor assembly 477 can be mounted. This top wall structure further has vent openings 479 and supports a vent cover 481 with corresponding vent openings 483. However, the chuck-arbor assembly in this case is mounted to the raised top wall structure of the housing in the same manner as the chuck-arbor assembly of the tall, rigid housing embodiment of FIGS. 31-33: it is mounted to slide within the housings top wall structure in the direction of the compression axis and is spring-loaded, in this case by compression spring 485. In this embodiment, the raised portion at the top of the rigid housing provides sufficient height to accommodate the secondary chuck 487 of the chuck-arbor assembly and the hole saw 489.

Figure 40A:
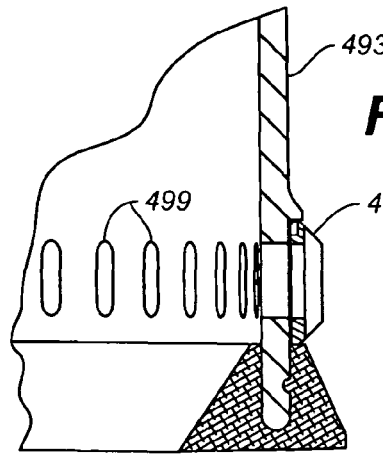
FIG. 40A is a fragmentary view thereof within lines 40A-40A in FIG. 40, showing the detail of the vent openings at the bottom of the debris collection housing.
Figure 40:
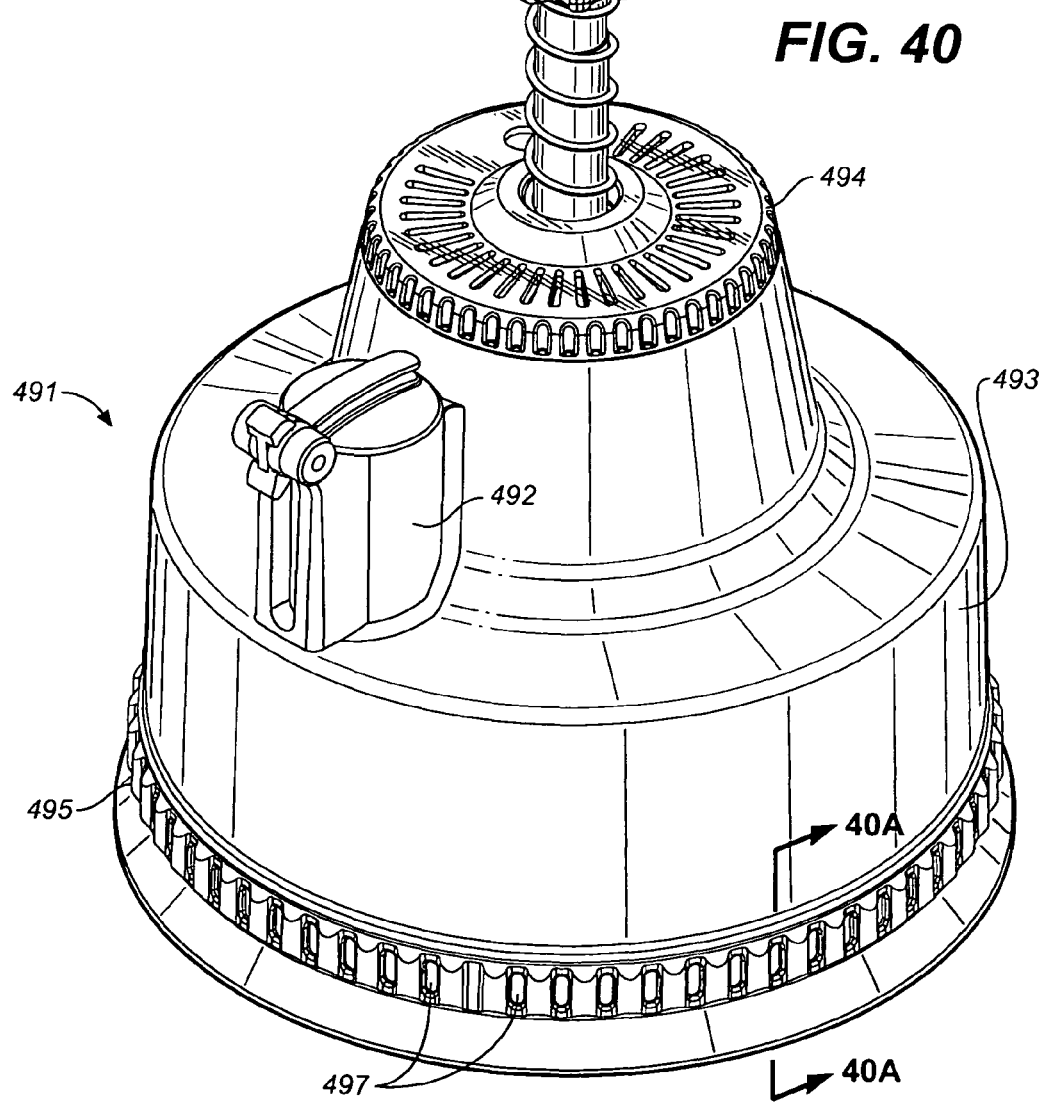
FIG. 40 is a top perspective view of a variation of the debris shield shown in FIGS. 38 and 39, wherein vents are added to the top of the debris collection housing.

FIGS. 40 and 40A show the embodiment of the invention seen in FIGS. 38-39, with a different venting scheme. In this version, the short debris shield 491, having vacuum port 492, is provided with an adjustable, slotted vent cover 494 as previously described, as well as adjustable venting around the bottom perimeter of the debris collection housing 493. The bottom perimeter venting is provided by a rotatable vent ring 495 having vent openings 497, which can be rotated into and out of registration with vent openings 499 around the bottom perimeter of the housing covered by the vent ring. This embodiment shows one alternative design to the vent ring previously described. With this vent ring, the air path is direct and not diverted through a shroud.

Therefore, it can be seen that the present invention is a debris shield for a rotary cutting or drilling implement that is relatively easy to install and use, that efficiently collects debris when drilling or cutting holes in work surfaces in vacuum and non-vacuum applications, and that provides versatility in the sizes and types of cutting implements that can be used with the shield. The invention also provides these advantages with a construction that can be assembled and disassembled with relative ease and is relatively compact. While the invention and its best mode have been described in considerable detail in the foregoing specification and the accompanying drawings, it shall be understood that it is not intended that the invention be limited to such detail, and that other embodiments would be possible falling within the scope of the invention, including the use of parts or materials other than those specifically described herein, and providing debris shields with different dimensions and shapes than those described.

What we claim is:

1. A debris shield for a rotary tool having a chuck for securing a rotating surface working implement having a working end, a shank, and an arbor end, said debris shield comprising
 a debris collection housing having a top, bellows side walls depending from the top of said housing to form a debris collection chamber, an open bottom with a surface contact rim, and a compression axis,
 a vacuum port on said debris collection housing through which air can be evacuated from said debris collection chamber when the surface contact rim of said debris collection housing is in contact with a surface, and
 a shank-holding and vent assembly mounted to the top of said debris collection housing and substantially centered on the compression axis thereof, said shank-holding and vent assembly including at least one vent opening for air intake when a vacuum is drawn on the bellows housing's vacuum port, and adapted to receive and rotatably hold the shank of a rotating working implement so that the implement can be rotated within said shank-holding and vent assembly.

2. The debris shield of claim wherein the at least one vent opening in said shank-holding and vent assembly is adjustable for adjusting air intake into said vacuum chamber.

3. The debris shield of claim 1 wherein said shank-holding and vent assembly comprises
 at least one vent plate secured to the top of said bellows housing, said vent plate having at least one vent opening, and
 an accessible vent cover rotatably affixed to said vent plate, said vent cover having at least one vent opening which rotates over the at least one vent opening in said vent plate upon rotation of said vent adjustment cover on said vent plate, whereby air intake into the collection chamber of said debris collection housing can be adjusted by rotating said vent cover.

4. The debris shield of claim 3 wherein said vent cover and at least one vent plate have a plurality of vent openings located such that the vent openings in said vent cover and vent plate can be moved into and out of alignment by rotating said vent cover.

5. The debris shield of claim 1 wherein said shank-holding and vent assembly includes a bushing aligned with said compression axis and sized to rotatably hold a correspondingly sized shank of a rotating working implement.

6. The debris shield of claim 5 wherein said bushing is removable and can be exchanged for bushings sized to hold rotating working implements having shanks of other sizes.

7. The debris shield of claim 1 wherein the top of said debris collection housing includes a top wait having a center mounting portion to which said shank-holding and vent assembly is mounted.

8. The debris shield of claim 7 wherein said vacuum port projects upwardly from the top wall of said housing.

9. The debris shield of claim 8 wherein said vacuum port as an angled top extension and is rotatably mounted to the top wall of said bellows housing such that the angled top extension can be swiveled to an optimum position for connecting a vacuum hose to the vacuum port.

10. The debris shield of claim 1 wherein said bellows housing is fabricated from an elastomeric material.

11. The debris shield of claim 10 wherein said bellows housing has an elastomeric top watt and wherein radial ribs are provided on said elastomeric top wall of said bellows housing to provide rigidity to said top wall.

12. A debris shield for a rotary tool having a chuck for securing a rotating surface working implement having a working end, a shank, and an arbor end, said debris shield comprising
 a debris collection bellows housing having a top wall with a center mounting portion, bellows side walls depending from said top wall to form a debris collection chamber, an open bottom end with a surface contact rim, and a compression axis extending through said top wall, a vacuum port projecting upwardly from the top wall of said debris collection housing adjacent said center mounting portion, and a shank-holding and vent assembly mounted to the center mounting portion of the top wall of said debris collection housing adapted to receive and hold the shank of a cutting implement so that the surface working implement can be rotated within said shank-holding and vent assembly, said shank-holding and vent assembly further including at least one vent plate secured to the center mounting portion of said bellows housing, said vent plate having at least one vent opening, and an accessible vent cover rotatably fixed to said vent plate, said vent cover having at least one vent opening which rotates over the at least one vent opening in said vent plate upon rotation of said vent adjustment cover on said vent plate, whereby venting into the collection chamber of said debris collection housing can be adjusted by rotating said vent cover on said vent plate.

13. The debris shield of claim 12 wherein said bellows housing is fabricated from an elastomeric material and has a raised center mounting portion with an inwardly projecting perimeter mounting platform for mounting said shank-holding and vent assembly, and wherein the top wall of the debris collection housing has reinforcement ribs formed therein extending laterally away from said raised center mounting portion to provide rigidity to said top wall.

14. The debris shield of claim 13 wherein said shank-holding and vent assembly has an upper and tower vent plate secured together so as to sandwich the mounting platform of the center mounting portion between the vent plates, each of said vent plates and said mounting platform having at least one vent opening and the vent openings of said vent plates and mounting platform being in alignment to provide air passage through the assembly of the vent plates on said mounting platform, and said vent cover being rotatably and accessibly fixed to said upper vent plate.

15. A debris shield for a rotary to t having a chuck for securing the arbor end of a rotary surface working implement, said debris shield comprising a debris collection housing having a rigid top structure having an upright cylinder wall including an at least one vent opening and side walls depending from said top structure to form a debris collection chamber, an open bottom with a surface contact rim, and a compression axis extending through said top structure and bottom opening, a vent sleeve disposed inside and rotatable within the upright cylinder wall of the rigid top structure of said debris collection chamber, said vent sleeve having at least one vent opening which can be moved into an out of alignment with the at least one vent opening in said top structure by moving said vent sleeve in relation to said top structure, whereby venting of said debris collection housing can be adjusted, a chuck-arbor assembly having a chuck end and an arbor end, said chuck-arbor assembly being mounted in the top structure of said debris collection housing so that the chuck end and arbor end of said chuck-arbor assembly lies on a rotary axis that is substantially parallel to the compression axis of said debris collection housing and so that the chuck end and arbor end of the chuck-arbor assembly can rotate on such rotary axis relative to said debris collection housing, the chuck end of the chuck-arbor assembly projecting into said housing for receiving and holding the arbor end of a surface working implement, and the arbor end of the chuck-arbor assembly projecting above the top structure of said housing such that said arbor end can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

16. A debris shield for a rotary tool having a chuck for securing the arbor end of a rotary surface working implement, said debris shield comprising a debris collection housing having a rigid top structure and side walls depending therefrom to form a debris collection chamber, an open bottom with a surface contact rim, and a compression axis extending through said top structure and bottom opening, and a vacuum port having a vacuum port closure cap attached thereto, a chuck-arbor assembly having a chuck end and an arbor end, said chuck-arbor assembly being mounted in the top structure of said debris collection housing so that the chuck end and arbor end thereof lie on a rotary axis that is substantially parallel to the compression axis of said debris collection housing and so that said chuck end and arbor end can rotate on their rotary axis relative to said debris collection housing, said chuck end of projecting into said housing for receiving and holding the arbor end of a surface working implement, and said arbor end of said chuck-arbor assembly projecting above the top structure of said debris collection housing such that said arbor end of said chuck-arbor assembly can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

17. The debris shield of claim 16 wherein said closure cap is hinged to said vacuum port.

18. The debris shield of claim 17 further comprising a cam element associated with said hinged closure cap that can be actuated to lock a vacuum hose in said vacuum port after the closure cap is opened.

19. The debris shield of claim 16 wherein said closure cap includes means for locking the closure cap in an open position.

20. The debris shield of claim 16 wherein said closure cap is tethered to said vacuum port.

21. A debris shield for a rotary tool having a chuck for securing the arbor end of a rotary surface working implement, said debris shield comprising a debris collection housing having a rigid top cover, bellows side walls secured to and depending from said top cover to form a debris collection chamber, said bellows sidewalls having an inwardly projecting top edge, a retaining ring for removably securing said bellows sidewalls to said top cover, said retaining ring positionable behind the projecting top edge of said bellows sidewalls for clamping said inwardly projecting top edge to said top cover, an open bottom with a surface contact rim, and a compression axis extending through said top cover and bottom opening, and a chuck-arbor assembly having a chuck end and an arbor end, said chuck-arbor assembly being mounted in the top cover of said debris collection housing so that the chuck end and arbor end of the chuck-arbor assembly lie on a rotary axis that is substantially parallel to the compression axis of said debris collection housing and so that the chuck end and arbor end of the chuck-arbor assembly can rotate on their rotary axis relative to said debris collection housing, the chuck end of said chuck-arbor assembly having a secondary chuck projecting into said housing for receiving and holding the arbor end of a surface working implement, and the arbor end of said chuck-arbor assembly projecting above the top structure of said housing such that the arbor end of said chuck-arbor assembly can be inserted into the chuck of a rotary tool or machine.

22. The debris shield of claim 21 wherein said top cover has a raised portion and wherein the secondary chuck of said chuck-arbor assembly resides in said raised portion.

23. The debris shield of claim 22 wherein said top cover further includes a skirt portion extending from said raised portion, and wherein a vacuum port is provided on said skirt portion so as to be accessible at the top of the debris shield.

24. The debris shield of claim 23 wherein at least one vent opening is provided in the raised portion of said top cover.

25. The debris shield of claim 24 wherein said vent opening is adjustable.

26. A debris shield for a rotary tool having a chuck for securing the arbor end of a rotary surface working implement, said debris shield comprising a rigid debris collection housing having a top structure and rigid sidewalls depending from said top structure to form a debris collection chamber, said top structure having a bearing support member that holds a ball bearing, said ball bearing having an inner bearing race, an open bottom with a surface contact rim, and a compression axis extending through said top structure and bottom opening, and a chuck-arbor assembly including a chuck shank having a chuck end and an arbor end, a threaded portion near the arbor end, said chuck shank is spring loaded for biasing said chuck-arbor assembly to a hilly retracted position, the spring loading is provided by means of a compression spring placed over said chuck shank above the top structure of said debris collection housing, said compression spring has a bottom end that bears against the inner race of said ball bearing and a top end secured to said chuck shank for rotating with said chuck shank, and a locking cap having a central opening, said locking cap being adapted to screw down onto the threaded portion of said chuck shank so as to capture the top end of said compression spring, the chuck shank of said chuck-arbor assembly being slidably and rotatably mounted in the top structure e of said debris collection housing so that it lies on a rotary axis that is substantially parallel to the compression axis of said debris collection housing and so that it can rotate on its rotary axis relative to said debris collection housing, a secondary chuck attached to the chuck end of said chuck shank, the secondary chuck of said chuck-arbor assembly projecting into said debris collection housing for receiving and holding the arbor end of a surface working implement, and the arbor end of said chuck shank projecting above the top structure of said housing such that the arbor end of said chuck-arbor assembly can be inserted into the chuck of a rotary tool or machine.

27. A debris shield for a rotary tool having a chuck for securing the arbor end of a rotary surface working implement, said debris shield comprising an at least partially rigid debris collection housing having a rigid top structure and side walls depending therefrom forming a debris collection chamber, and further having an open bottom with a surface contact rim, a rigid bottom perimeter wall near the surface contact rim, said rigid bottom perimeter wall having bottom vent openings, and a compression axis extending through said top structure and bottom opening, a vent ring rotatably surrounding said bottom perimeter wall of said debris collection housing, said vent ring having vent openings corresponding to the vent openings in said bottom perimeter wall, wherein said vent ring can be rotated into and out of alignment with the vent openings in said bottom perimeter wall for vent adjustment, and wherein the vent openings in said vent ring are shrouded to prevent debris from being propelled out of said vent openings, a chuck-arbor assembly having a chuck end and an arbor end, said chuck-arbor assembly mounted in the top structure of said debris collection housing so that the chuck end and arbor end thereof lie on a rotary axis that is substantially parallel to the compression axis of said debris collection housing and so that the chuck end and arbor end of the chuck-arbor assembly can rotate on their rotary axis relative to said debris collection housing, the chuck end of said chuck-arbor assembly projecting into said housing for receiving and holding the arbor end of a surface working implement, and the arbor end of said chuck-arbor assembly projecting above the top structure of said housing such that it can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at said arbor end of said chuck-arbor assembly in the direction of said compression axis.

28. A debris shield for a rotary toot having a chuck for securing the arbor end of a rotary surface working implement, said debris shield comprising a debris collection housing having a rigid top structure side walls depending therefrom to form a debris collection chamber, an open bottom with a surface contact rim, and a compression axis extending through said top structure and bottom opening, a chuck-arbor assembly having a chuck end, an arbor end, a threaded portion that projects above the top structure of said debris collection housing, and an internally threaded cap nut adapted to screw down onto said threaded portion for securing said chuck-arbor assembly to the top structure, said chuck-arbor assembly being mounted in the top structure of said debris collection housing so that the chuck end and arbor end thereof lie on a rotary axis that is substantially parallel to the compression axis of said debris collection housing, and so that the chuck end and arbor end thereof can rotate on their rotary axis relative to said debris collection housing, the chuck end of said chuck-arbor assembly projecting into said debris collection housing for receiving and holding the arbor end of a surface working implement, the arbor end of said chuck-arbor assembly projecting above the top structure of said debris collection housing such that said arbor end can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at said arbor end of said chuck-arbor assembly in the direction of said compression axis.

29. A debris shield for a rotary tool having a chuck for securing the arbor end of a rotary surface working implement, said debris shield comprising a debris collection housing having a rigid top cover, bellows side walls secured to and depending from said top cover to form a debris collection chamber, an open bottom with a surface contact rim, and a compression axis extending through said top cover and bottom opening, a chuck-arbor assembly having a chuck end and an arbor end, said chuck-arbor assembly being mounted in the top cover of said debris collection housing so that the chuck end and arbor end thereof lie on a rotary axis that is substantially parallel to the compression axis of said debris collection housing, and so that said chuck end and arbor end can rotate on their rotary axis relative to said debris collection housing, the chuck end of said chuck-arbor assembly having a secondary chuck projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, the rigid top cover of said debris collection housing having a raised portion wherein the secondary chuck of said chuck-arbor assembly resides in said raised portion, the raised portion of said top cover having at least one adjustable vent opening.

30. A debris shield for a rotary tool having a chuck for securing the arbor end of a rotary surface working implement, said debris shield comprising a rigid debris collection housing having a rigid top structure and rigid sidewalls depending from said top structure to form a debris collection chamber, and further having an open bottom with a surface contact rim and a compression axis extending through said top structure and bottom opening, the rigid top structure of the debris collection housing including at least one vent opening for air intake directly into said debris collection chamber at the location of said top rigid structure, a chuck-arbor assembly having a chuck end and an arbor end, said chuck-arbor assembly being mounted in the top structure of said debris collection housing so that the chuck end and arbor end of said chuck-arbor assembly lie on a rotary axis that is substantially parallel to the compression axis of said debris collection housing, and so that the chuck end and arbor end of said chuck-arbor assembly can rotate on their rotary axis relative to said debris collection housing, the chuck end of said chuck-arbor assembly projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, said chuck-arbor assembly being mounted in the top structure of said debris collection housing such that the arbor end of said chuck-arbor assembly slides in the top structure of said debris collection housing and is biased to a retracted position by a biasing force, such that, when the bottom rim of said housing is placed against a work surface, compression along the compression axis of said debris collection causes the arbor end and chuck end of said chuck-arbor assembly to advance through the top structure of the debris collection housing and toward the work surface housing and is achieved when a force is applied in the direction of the compression axis at the arbor end of said chuck-arbor assembly against the biasing force holding the chuck-arbor assembly in a retracted position.

31. A debris shield for a rotary toot having a chuck for securing the arbor end of a rotary surface working implement, said debris shield comprising a debris collection housing having vacuum port, a rigid top structure and side walls depending from said top structure to form a debris collection chamber, and further having an open bottom with a surface contact rim and a compression axis extending through said top structure and bottom opening, the rigid top structure of the debris collection housing at least one vent opening for air intake directly into said debris collection chamber at the location of said top rigid structure, a chuck-arbor assembly having a chuck end and an arbor end, said chuck-arbor assembly being mounted in the top structure of said debris collection housing so that the chuck end and arbor end of said chuck-arbor assembly he on a rotary axis that is substantially parallel to the compression axis of said debris collection housing, and so that the chuck end and arbor end of said chuck-arbor assembly can rotate on their rotary axis relative to said debris collection housing, the chuck end of said chuck-arbor assembly projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

32. A debris shield for a rotary tool having a chuck for securing the arbor end of a rotary surface working implement, said debris shield comprising a debris collection housing having a rigid top structure and side walls depending from said top structure to form a debris collection chamber, and further having an open bottom with a surface contact rim and a compression axis extending through said top structure and bottom opening, the rigid top structure of the debris collection housing including at least one adjustable vent opening for air intake directly into said debris collection chamber at the location of said top rigid structure, a chuck-arbor assembly having a chuck end and an arbor end, said chuck-arbor assembly being mounted in the top structure of said debris collection housing so that the chock end and arbor end of said chuck-arbor assembly lie on a rotary axis that is substantially parallel to the compression axis of said debris collection housing, and so that the chuck end and arbor end of said chuck-arbor assembly can rotate on their rotary axis relative to said debris collection housing, the chuck end of said chuck-arbor assembly projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

33. A debris shield for a rotary tool having a chuck for securing the arbor end of a rotary surface working implement, said debris shield comprising a debris collection housing having a rigid top structure and side walls depending from said top structure to form a debris collection chamber, and further having an open bottom with a surface contact rim and a compression axis extending through said top structure and bottom opening, the rigid top structure of the debris collection housing including at least two vent openings for air intake directly into said debris collection chamber at the location of said top rigid structure, a chuck-arbor assembly having a chuck end and an arbor end, said chuck-arbor assembly being mounted in the top structure of said debris collection housing so that the chuck end and arbor end of said chuck-arbor assembly lie on a rotary axis that is substantially parallel to the compression axis of said debris collection housing, and so that the chuck end and arbor end of said chuck-arbor assembly can rotate on their rotary axis relative to said debris collection housing, said at least two vent openings being distributed around the rotary axis of said chuck-arbor assembly, the chuck end of said chuck-arbor assembly projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

34. A debris shield for a rotary tool having a chuck for securing the arbor end of a rotary surface working implement, said debris shield comprising a debris collection housing having a rigid top structure and side walls depending from said top structure to form a debris collection chamber, and further having an open bottom with a surface contact rim and a compression axis extending through said top structure and bottom opening, the rigid top structure of the debris collection housing including at least one vent opening for air intake directly into said debris collection chamber at the location of said top rigid structure, a vent adjustment member associated with and that can be moved in relation to the top structure of said debris collection housing, said vent adjustment member having at least one vent opening which can be moved into and out of alignment with the at least one vent opening in the top structure of the debris collection housing by moving said vent adjustment member in relation to said top structure, whereby venting of said debris collection housing can be adjusted, a chuck-arbor assembly having a chuck end and an arbor end, said chuck-arbor assembly being mounted in the top structure of said debris collection housing so that the chuck end and arbor end of said chuck-arbor assembly lie on a rotary axis that is substantially parallel to the compression axis of said debris collection housing, and so that the chuck end and arbor end of said chuck-arbor assembly can rotate on their rotary axis relative to said debris collection housing, the chuck end of said chuck-arbor assembly projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis, 35. The debris shield of claim 34 wherein said vent adjustment member is rotatable around the compression axis of said housing, and wherein vent adjustment is achieved by rotating said vent adjustment member.

36. The debris shield of claim 35 wherein the top structure of said debris collection housing has a top wall structure substantially perpendicular to said compression axis, and at least one vent opening in said top wall structure, and wherein said vent adjustment member is provided in the form a vent cover rotatably fixed to said top wall structure.

37. A debris shield for a rotary tool having a chuck for securing the arbor end of a rotary surface working implement, said debris shield comprising a debris collection housing having a rigid top structure and side walls depending from said top structure to form a debris collection chamber, and further having an open bottom with a surface contact rim, a rigid bottom perimeter wall near the surface contact rim, and a compression axis extending through said top structure and bottom opening, the rigid top structure of the debris collection housing including at least one vent opening for air intake directly into said debris collection chamber at the location of said top rigid structure, and bottom vent openings further being provided around the rigid bottom perimeter wall of said debris collection housing, a chuck-arbor assembly having a chuck end and an arbor end, said chuck-arbor assembly being mounted in the top structure of said debris collection housing so that the chuck end and arbor end of said chuck-arbor assembly lie on a rotary axis that is substantially parallel to the compression axis of said debris collection housing, and so that the chuck end and arbor end of said chuck-arbor assembly can rotate on their rotary axis relative to said debris collection housing, the chuck end of said chuck-arbor assembly projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

38. The debris shield of claim 37 further comprising a vent ring rotatably surrounding the bottom perimeter wall of the debris collection housing, said vent ring having vent openings corresponding to the vent openings in said bottom perimeter wall, wherein said vent ring can be rotated into and out of alignment with the vent openings in said bottom perimeter wall for vent adjustment.

39. The debris shield of claim 38 wherein the vent openings in said vent ring are shrouded to prevent debris from being propelled out of said vent openings.

40. A debris shield for a rotary tool having a chuck for securing the arbor end of a rotary surface working implement, said debris shield comprising a debris collection housing having a rigid top structure and side walls depending from said top structure to form a debris collection chamber, and further having an open bottom with a surface contact rim and a compression axis extending through said top structure and bottom opening, the rigid top structure of the debris collection housing including at least one vent opening for air intake directly into said debris collection chamber at the location of said top rigid structure, a chuck-arbor assembly having a chuck end and an arbor end, said chuck-arbor assembly being mounted in the top structure of said debris collection housing so that the chuck end and arbor end of said chuck-arbor assembly lie on a rotary axis that is substantially parallel to the compression axis of said debris collection housing, and so that the chuck end and arbor end of said chuck-arbor assembly can rotate on their rotary axis relative to said debris collection housing, the chuck end of said chuck-arbor assembly projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, said chuck-arbor assembly further including a threaded portion at the arbor end thereof that projects above the top structure of said debris collection housing, and an internally threaded cap nut adapted to screw down onto said threaded portion for securing the chuck-arbor assembly to said top structure, and wherein the arbor end of said chuck-arbor assembly is inserted through the top structure of the debris collection housing from the housing's bottom opening and is releasably secured to said top structure by screwing said cap nut onto the threaded portion of said chuck-arbor assembly that projects above the top structure of said debris collection housing, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

41. A debris shield for a rotary tool having a chuck for securing the arbor end of a rotary surface working implement, said debris shield comprising a debris collection housing having a transparent rigid top structure and transparent side walls depending from said top structure to form a debris collection chamber, and further having an open bottom with a surface contact rim and a compression axis extending through said top structure and bottom opening, the rigid top structure of the debris collection housing including at least one vent opening for air intake directly into said debris collection chamber at the location of said top rigid structure, a chuck-arbor assembly having a chuck end and an arbor end, said chuck-arbor assembly being mounted in the top structure of said debris collection housing so that the chuck end and arbor end of said chuck-arbor assembly lie on a rotary axis that is substantially parallel to the compression axis of said debris collection housing, and so that the chuck end and arbor end of said chuck-arbor assembly can rotate on their rotary axis relative to said debris collection housing, the chuck end of said chuck-arbor assembly projecting into said debris collection housing for receiving and holding the arbor end of a surface working implement , and the arbor end of said chuck-arbor assembly projecting above the top structure of said debris collection housing such that the arbor end of said chuck-arbor assembly can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

42. A debris shield for a rotary tool having a chuck for securing the arbor end of a rotary surface working implement, said debris shield comprising a debris collection housing having a rigid top structure and side walls depending from said top structure to form a debris collection chamber, and further having an open bottom with a surface contact and a compression axis extending through said top structure and bottom opening, the surface contact rim being a separate resilient element fitted onto the bottom of the sidewalls of said debris collection housing, and the rigid top structure of the debris collection housing including at least one vent opening for air intake directly into said debris collection chamber at the location of said top rigid structure, a chuck-arbor assembly having a chuck end and an arbor end, said chuck-arbor assembly being mounted in the top structure of said debris collection housing so that the chuck end and arbor end of said chuck-arbor assembly lie on a rotary axis that is substantially parallel to the compression axis of said debris collection housing, and so that the chuck end and arbor end of said chuck-arbor assembly can rotate on their rotary axis relative to said debris collection housing, the chuck end of said chuck-arbor assembly projecting into said debris collection housing for receiving and holding the arbor end of a surface working implement, and the arbor end of said chuck-arbor assembly projecting above the top structure of said debris collection housing such that the arbor end of said chuck-arbor assembly can be inserted into the chuck of a rotary tool or machine, and means for providing compression along the compression axis of said housing when the bottom rim of said housing is placed against a work surface, such that said chuck-arbor assembly can be made to advance along said compression axis toward a surface against which the bottom rim of said housing is placed by applying a force at the arbor end of said chuck-arbor assembly in the direction of said compression axis.

43. The debris shield of claim 42 wherein said surface contact rim has a bottom contact surface for contacting a work surface to provide a contact seal between contact rim of said debris collection housing and the work surface and further having an angled inner rim wall which meets said bottom contact surface at an acute angle.

44. The debris shield of claim 31 wherein said vacuum port is located on the rigid to structure of said debris collection housing.

45. The debris shield of claim 44 wherein the depending side walls of said debris collection housing form a bellows, and wherein said bellows provides for compression along the compression axis of said housing when a force is applied at the arbor end of said chuck-arbor assembly in the direction of said compression axis.

46. The debris shield of claim 31 wherein said at least one vent opening is sized to allow access by an implement to dislodge material in the debris collection chamber of said debris collection housing.

47. The debris shield of claim 31 wherein the chuck end of said chuck-arbor assembly has a keyless chuck.

* * * * *

UNITED STATES PATENT AND TRADEMARK OFFICE
CERTIFICATE OF CORRECTION

| | |
|---|---|
| PATENT NO. | : 7,901,164 B2 |
| APPLICATION NO. | : 11/510260 |
| DATED | : March 8, 2011 |
| INVENTOR(S) | : Thomas J. Skradski and Gary L. Cross |

It is certified that error appears in the above-identified patent and that said Letters Patent is hereby corrected as shown below:

In column 2, line 35, "360, degree" should read --360 degree--.
In column 6, line 13, "bellow" should read --bellows--.
In column 7, line 27, "vents" should read --vent--.
In column 9, line 32, "end of shaft" should read --end of the shaft--.
In column 12, line 19, "supports" should read --support's--.
In column 14, line 8, --top cover-- should be inserted between "the" and "of this.".
In column 14, line 27, "the by" should read --by the--.
In column 16, line 38, "place-against" should read --place against--.
In column 16, line 61, "vacuum ported" should read --vacuum-ported--.
In column 17, line 24, "housings" should read --housing's--.
In column 18, line 16, "claim wherein" should read --claim 1 wherein--.
In column 18, line 44, "top wait" should read --top wall--.
In column 18, line 49, "port as" should read --port has--.
In column 18, line 57, "top watt" should read --top wall--.
In column 19, line 31, "tower vent" should read --lower vent--.
In column 19, line 40, "to t" should read --tool--.
In column 19, line 44, "an at least" should read --at least--.
In column 19, line 53, "an out of" should read --and out of--.
In column 19, line 62, "lies" should read --lie--.
In column 20, line 30, "of" should be deleted between "end" and "projecting.".
In column 21, line 45, "hilly" should read --fully--.
In column 21, line 57, "e" should be deleted between "structure" and "of.".
In column 22, line 13, "bottom opening" should read --open bottom--.
In column 22, line 45, "toot" should read --tool--.
In column 22, line 48, "structure side" should read --structure, side--.
In column 23, line 17, "wails" should read --walls--.
In column 24, line 18, "toot" should read --tool--.
In column 24, line 21, --a-- should be inserted between "having" and "vacuum.".
In column 24, line 34, "he on" should read --lie on--.

Signed and Sealed this
Eighteenth Day of October, 2011

David J. Kappos
*Director of the United States Patent and Trademark Office*

CERTIFICATE OF CORRECTION (continued)
U.S. Pat. No. 7,901,164 B2

In column 25, line 2, "chock" should read --chuck--.
In column 25, line 34, "top rigid" should read --rigid top--.
In column 26, line 5, "top rigid" should read --rigid top--.
In column 26, line 47, "form a" should read --form of a--.
In column 28, line 54, --rim-- should be inserted between "contact" and "and."
In column 30, line 6, "rigid to" should read --rigid top--.